United States Patent
Maeda et al.

(10) Patent No.: US 11,132,964 B2
(45) Date of Patent: Sep. 28, 2021

(54) DISPLAY DEVICE AND DISPLAY METHOD

(71) Applicant: PANASONIC INTELLECTUAL PROPERTY MANAGEMENT CO., LTD., Osaka (JP)

(72) Inventors: Toshiyuki Maeda, Hyogo (JP); Hideki Aoyama, Osaka (JP); Kensuke Nagauchi, Osaka (JP); Kazuhiko Nono, Osaka (JP); Kazuma Sakamoto, Osaka (JP); Mitsuaki Oshima, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/761,709

(22) PCT Filed: Oct. 4, 2018

(86) PCT No.: PCT/JP2018/037185
§ 371 (c)(1),
(2) Date: May 5, 2020

(87) PCT Pub. No.: WO2019/097882
PCT Pub. Date: May 23, 2019

(65) Prior Publication Data
US 2020/0335050 A1    Oct. 22, 2020

(30) Foreign Application Priority Data
Nov. 14, 2017 (JP) .............................. JP2017-219284

(51) Int. Cl.
*G09G 3/36* (2006.01)
*G09G 5/10* (2006.01)
*H04N 9/31* (2006.01)

(52) U.S. Cl.
CPC ............. *G09G 3/3607* (2013.01); *G09G 5/10* (2013.01); *H04N 9/3182* (2013.01); *G09G 2320/0646* (2013.01); *G09G 2360/141* (2013.01)

(58) Field of Classification Search
None
See application file for complete search history.

(56) References Cited

U.S. PATENT DOCUMENTS

2014/0085346 A1 *   3/2014   Tsukagoshi .......... G09G 3/3406
                                                                 345/690
2016/0180779 A1     6/2016   Suzuki et al.
(Continued)

FOREIGN PATENT DOCUMENTS

JP     2017-050695       3/2017
WO   WO 2015/059852    4/2015
WO   WO 2016/047030    3/2016

OTHER PUBLICATIONS

International Search Report issued in corresponding International Application No. PCT/JP2018/037185, dated Jan. 8, 2019.

*Primary Examiner* — Amr A Awad
*Assistant Examiner* — Donna V Bocar
(74) *Attorney, Agent, or Firm* — Greenblum & Bernstein, P.L.C.

(57) ABSTRACT

A display device includes a liquid crystal panel and a light source that emits light onto the liquid crystal panel, the display device including: a video signal obtainer that obtains a video signal; a visible light signal obtainer that obtains a visible light signal; a panel controller that drives the liquid crystal panel at a predetermined frequency according to the video signal obtained; and a light source controller that repeats, in a predetermined cycle, a first control for causing a luminance change in the light source according to the visible light signal. The light source controller synchronizes (Continued)

a control for repeating the first control with a cycle for driving the liquid crystal panel by the panel controller.

17 Claims, 15 Drawing Sheets

(56) References Cited

U.S. PATENT DOCUMENTS

2017/0061900 A1   3/2017  Ueki et al.
2017/0063456 A1   3/2017  Yamasaki et al.
2017/0069275 A1*  3/2017  Sengoku .............. G09G 3/3677

* cited by examiner

FIG. 13

60 Hz VIDEO (LIQUID CRYSTAL DRIVE CYCLE [180 Hz] = 0.056 s)

| TIME (s) | IMAGE CAPTURE CYCLE OF CAMERA | TRANSMISSION FRAME |
|---|---|---|
| 0.0056 | ANALYSIS | 1 |
| 0.0111 |  | 2 |
| 0.0167 |  | 3 |
| 0.0222 |  | 4 |
| 0.0278 |  | 5 |
| 0.0333 |  | 1 |
| 0.0389 | PREVIEW | 2 |
| 0.0444 |  | 3 |
| 0.0500 |  | 4 |
| 0.0556 |  | 5 |
| 0.0611 |  | 1 |
| 0.0667 |  | 2 |
| 0.0722 | ANALYSIS | 3 |
| 0.0778 |  | 4 |
| 0.0833 |  | 5 |
| 0.0889 |  | 1 |
| 0.0944 |  | 2 |
| 0.1000 |  | 3 |
| 0.1056 | PREVIEW | 4 |
| 0.134 |  | 5 |
| 0.1407 |  | 1 |
| 0.1474 |  | 2 |
| 0.1541 |  | 3 |
| ... |  | ... |

VISIBLE LIGHT SIGNAL OBTAINABLE

FIG. 14

50 Hz VIDEO (LIQUID CRYSTAL DRIVE CYCLE [150 Hz] = 0.067 s)

| TIME (s) | IMAGE CAPTURE CYCLE OF CAMERA | TRANSMISSION FRAME |
|---|---|---|
| 0.0067 | ANALYSIS | 1 |
| 0.0134 | | 2 |
| 0.0201 | | 3 |
| 0.0268 | | 4 |
| 0.0335 | | 5 |
| 0.0402 | PREVIEW | 1 |
| 0.0469 | | 2 |
| 0.0536 | | 3 |
| 0.0603 | | 4 |
| 0.067 | | 5 |
| 0.0737 | ANALYSIS | 1 |
| 0.0804 | | 2 |
| 0.0871 | | 3 |
| 0.0938 | | 4 |
| 0.1005 | | 5 |
| 0.1072 | PREVIEW | 1 |
| 0.1139 | | 2 |
| 0.1206 | | 3 |
| 0.1273 | | 4 |
| 0.134 | | 5 |
| 0.1407 | ANALYSIS | 1 |
| 0.1474 | | 2 |
| 0.1541 | | 3 |
| ... | | ... |

VISIBLE LIGHT SIGNAL UNOBTAINABLE

FIG. 15

50 Hz VIDEO (LIQUID CRYSTAL DRIVE CYCLE [150 Hz] = 0.067 s)

| TIME (s) | IMAGE CAPTURE CYCLE OF CAMERA | TRANSMISSION FRAME |
|---|---|---|
| 0.0067 | ANALYSIS | 1 |
| 0.0134 | | 2 |
| 0.0201 | | 3 |
| 0.0268 | | 4 |
| 0.0335 | | 5 |
| 0.0402 | PREVIEW | 2 |
| 0.0469 | | 3 |
| 0.0536 | | 4 |
| 0.0603 | | 5 |
| 0.067 | | 1 |
| 0.0737 | ANALYSIS | 3 |
| 0.0804 | | 4 |
| 0.0871 | | 5 |
| 0.0938 | | 1 |
| 0.1005 | | 2 |
| 0.1072 | PREVIEW | 4 |
| 0.1139 | | 5 |
| 0.1206 | | 1 |
| 0.1273 | | 2 |
| 0.134 | | 3 |
| 0.1407 | ANALYSIS | 5 |
| 0.1474 | | 1 |
| 0.1541 | | 2 |
| ... | | ... |

VISIBLE LIGHT SIGNAL OBTAINABLE

DISPLAY DEVICE AND DISPLAY METHOD

TECHNICAL FIELD

The present disclosure relates to a display device that emits light including a visible light signal, and a display method.

BACKGROUND ART

Patent Literature (PTL) 1 discloses a guide display device including a light source that emits light for visible light communication, and a housing that is provided with a guide display and marks.

CITATION LIST

Patent Literature

PTL 1: Japanese Unexamined Patent Application Publication No. 2017-50695

SUMMARY OF THE INVENTION

Technical Problem

However, even when a light source that emits light for visible light communication as disclosed in PTL 1 is used for a display device including a liquid crystal panel, it is difficult to effectively display a video.

In view of this, the present disclosure provides a display device that includes a light source which emits light including a visible light signal, and a liquid crystal panel, and that is capable of effectively displaying a video.

Solution to Problem

A display device according to one aspect of the present disclosure is a display device that includes a liquid crystal panel and a light source that emits light onto the liquid crystal panel, the display device including: a video signal obtainer that obtains a video signal; a visible light signal obtainer that obtains a visible light signal; a panel controller that drives the liquid crystal panel at a predetermined frequency according to the video signal obtained; and a light source controller that repeats, in a predetermined cycle, a first control for causing a luminance change in the light source according to the visible light signal. The light source controller synchronizes a control for repeating the first control with a cycle for driving the liquid crystal panel by the panel controller.

It should be noted that these general and specific aspects may be realized by a system, a method, an integrated circuit, a computer program, or a computer-readable recording medium such as a compact disc read-only memory (CD-ROM), or may be realized by any combination of systems, methods, integrated circuits, computer programs, and recording media.

Advantageous Effect of Invention

A display device and a display method according to the present disclosure are capable of effectively displaying a video.

BRIEF DESCRIPTION OF DRAWINGS

FIG. 13 is a diagram illustrating transmission frames obtained by the receiving device when a set of five transmission frames is transmitted by driving the liquid crystal panel at a drive frequency of 180 Hz.

FIG. 14 is a diagram illustrating transmission frames obtained by the receiving device when a set of five transmission frames is transmitted by driving the liquid crystal panel at a drive frequency of 150 Hz.

FIG. 15 is a diagram illustrating transmission frames obtained by the receiving device when a set of five transmission frames is transmitted in a different order for each signal unit by driving the liquid crystal panel at a drive frequency of 150 Hz.

Figure 1:
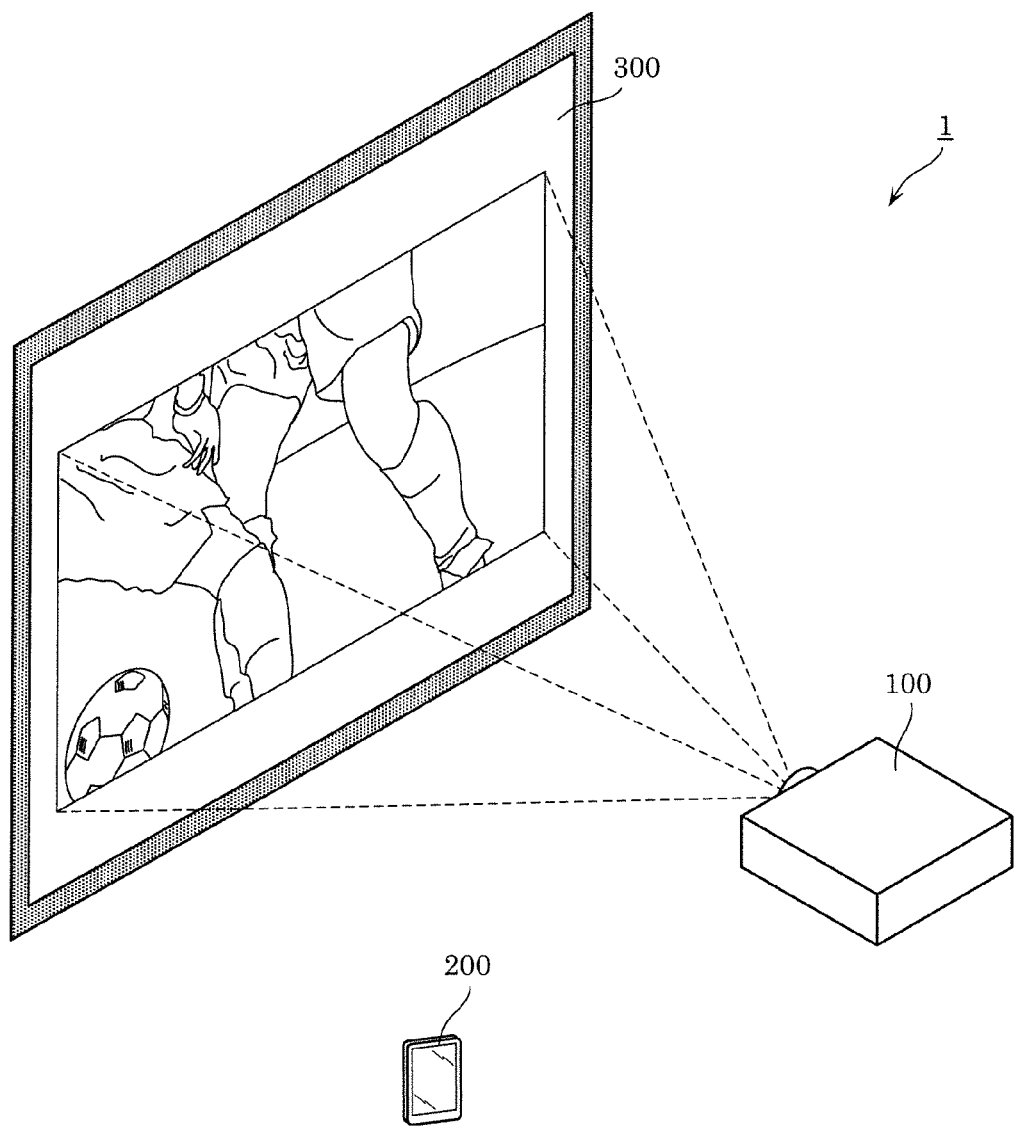
FIG. 1 is a schematic diagram illustrating a communication system according to an embodiment.

DESCRIPTION OF EXEMPLARY EMBODIMENTS (Underlying Knowledge Forming Basis of the Present Disclosure)

The inventors have found that the following problems occur with regard to the guide display device described in the "BACKGROUND ART" section.

When a light source that emits light for visible light communication is used for a display device including a liquid crystal panel, a light source of the liquid crystal panel is caused to change a luminance according to a visible light signal. When the light source is caused to change the luminance as above while a video such as moving pictures is displayed using the liquid crystal panel, noise is generated in a video displayed by the display device or a video projected by the display device. In particular, the inventors have found that noise generated in a video becomes more prominent as the periodicity of the luminance change in the light source is lower. Examples of the luminance change in the light source include a luminance change by a pulse-width modulation (PWM) control, a luminance change indicating preamble portions (to be described later) of a visible light signal, and a luminance change indicating data portions (to be described later) of a visible light signal. Of these luminance changes, the luminance change indicating the preamble portions of the visible light signal has a tendency to be lower in periodicity than the luminance change by the PWM control, and the luminance change indicating the data portions of the visible light signal has a tendency to be lower in periodicity than the luminance change indicating the preamble portions of the visible light signal.

It should be noted that, here, that periodicity is high means that a degree of matching between the first phenomenon and the second phenomenon among phenomena occurring in predetermined cycles is high. A degree of matching is, for example, a correlation coefficient between the first phenomenon and the second phenomenon. That a degree of matching is high means that a correlation coefficient is close to 1. In addition, that periodicity is high means that a degree of overlap between the first phenomenon and the second phenomenon is high.

In order to solve those problems, a display device according to one aspect of the present disclosure is a display device that includes a liquid crystal panel and a light source that emits light onto the liquid crystal panel, the display device including: a video signal obtainer that obtains a video signal; a visible light signal obtainer that obtains a visible light signal; a panel controller that drives the liquid crystal panel at a predetermined frequency according to the video signal obtained; and a light source controller that repeats, in a predetermined cycle, a first control for causing a luminance change in the light source according to the visible light signal. The light source controller synchronizes a control for repeating the first control with a cycle for driving the liquid crystal panel by the panel controller.

With this, since the light source controller causes the luminance change in the light source in synchronization with the cycle for driving the liquid crystal panel by the panel controller, the light source controller enables the above luminance change in a constant period of the cycle for driving the liquid crystal panel. As a result, it is possible to reduce noise generated in a video displayed or projected by the display device.

Moreover, the light source controller may alternately repeat, in the predetermined cycle, the first control and a second control for causing a cyclic luminance change or an ON state in the light source.

With this, it is possible to emit the light having the stable luminance onto the liquid crystal panel in a period during which the first control is not performed. As a result, it is possible to effectively reduce noise generated in a video displayed or projected by the display device.

Moreover, the panel controller may drive the liquid crystal panel at the predetermined frequency by alternately repeating a third control for changing a transmittance of the liquid crystal panel according to the video signal and a fourth control for retaining the transmittance of the liquid crystal panel that has been changed, and the light source controller may perform the first control in a period during which the panel controller performs the fourth control.

With this, since the light source controller performs the first control for causing the luminance change in the light source according to the visible light signal in the period during which the fourth control for retaining the transmittance of the liquid crystal panel, it is possible to suppress performance of the first control in the period during which the third control for changing the transmittance of the liquid crystal panel is performed. As a result, it is possible to effectively reduce noise generated in a video displayed or projected by the display device.

Moreover, the panel controller may drive the liquid crystal panel at the predetermined frequency by alternately repeating a third control for changing a transmittance of the liquid crystal panel according to the video signal and a fourth control for retaining the transmittance of the liquid crystal panel that has been changed, and the light source controller may: (i) alternately repeat, in the predetermined cycle, the first control and a second control for causing a cyclic luminance change or an ON state in the light source; (ii) perform the first control in a period during which the panel controller performs the fourth control; and (iii) start and end the second control in a period during which the panel controller performs the third control.

With this, the display device can cause the light source to emit the light having the stable luminance onto the liquid crystal panel in the period during which the panel controller performs the third control. As a result, it is possible to effectively reduce noise generated in a video displayed or projected by the display device.

Moreover, the light source controller may: (i) perform, in the first control, a fifth control for causing a luminance change in a pattern in which an amount of deviation from a previous first control is less than a threshold value, and a sixth control for causing a luminance change in a pattern in which the amount of deviation from the previous first control is greater than or equal to the threshold value; and (ii) perform the sixth control longer in a period during which the panel controller performs the fourth control than in a period during which the panel controller performs the third control.

With this, the display device can suppress performance of the sixth control included in the first control in the period during which the panel controller performs the third control. Moreover, since the sixth control is performed only at the beginning of the period during which the third control is performed, it is possible to limit, even when noise is generated in a video, an area in which the noise is generated to the upper area of an image. As a result, it is possible to effectively reduce noise generated in a video displayed or projected by the display device.

Moreover, the light source controller may perform the sixth control in a period that is at least half as long as the period during which the panel controller performs the fourth control.

With this, the display device can suppress performance of the sixth control included in the first control in the period during which the panel controller performs the third control. Moreover, since the sixth control is performed only at the beginning of the period during which the third control is performed, it is possible to limit, even when noise is generated in a video, an area in which the noise is generated to the upper area of an image. As a result, it is possible to effectively reduce noise generated in a video displayed or projected by the display device.

Moreover, the light source controller may perform the sixth control over the period during which the panel controller performs the fourth control.

With this, the display device can suppress performance of the sixth control included in the first control in the period during which the panel controller performs the third control.

As a result, it is possible to effectively reduce noise generated in a video displayed or projected by the display device.

Moreover, the light source controller may perform, in the second control, a pulse-width modulation (PWM) control for causing a luminance change at a frequency higher than a frequency at which the luminance change is caused by the first control.

With this, it is possible to emit light having more stable luminance onto the liquid crystal panel in the period during which the third control is not performed. As a result, it is possible to effectively reduce noise generated in a video displayed or projected by the display device.

Moreover, the light source controller may adjust a duty cycle in the luminance change caused by the second control to a duty cycle in the luminance change caused by the first control.

With this, it is possible to emit the light having a certain luminance onto the liquid crystal panel both in the period during which the first control is performed and in the period during which the second control is performed. As a result, it is possible to effectively reduce noise generated in a video displayed or projected by the display device.

Moreover, the visible light signal may be used for transmitting a signal unit indicating predetermined information multiple times, and may include signal units each being the signal unit, the display device may further include: a generator that divides each of the signal units into blocks, and generates the visible light signal including transmission frames, using the blocks, and when the predetermined frequency at which the liquid crystal panel is driven is a first frequency, in generating the visible light signal, the generator may cause order of transmission frames of first blocks obtained by dividing a first signal among the signal units to be different from order of transmission frames of second blocks obtained by dividing a second signal among the signal units.

With this, the receiving device can efficiently obtain all the blocks corresponding to the signal unit, and easily decode the signal unit.

Moreover, the visible light signal may be used for transmitting a signal unit indicating predetermined information multiple times, and may include signal units each being the signal unit, the panel controller may drive the liquid crystal panel at the predetermined frequency by alternately repeating a third control for changing a transmittance of the liquid crystal panel according to the video signal and a fourth control for retaining the transmittance of the liquid crystal panel that has been changed, the display device may further include: a generator that divides each of the signal units into blocks, and generates the visible light signal including transmission frames, using the blocks, and when the predetermined frequency at which the liquid crystal panel is driven is a first frequency: in generating the visible light signal, the generator may cause order of transmission frames of first blocks obtained by dividing a first signal among the signal units to be different from order of transmission frames of second blocks obtained by dividing a second signal among the signal units; and the light source controller may perform the first control in a period during which the panel controller performs the fourth control.

With this, the receiving device can efficiently obtain all the blocks corresponding to the signal unit, and easily decode the signal unit.

Moreover, the visible light signal may be used for transmitting a signal unit indicating predetermined information multiple times, and may include signal units each being the signal unit, the display device may further include: a generator that divides each of the signal units into N blocks, and generates the visible light signal including N transmission frames, using the N blocks, and when N is a first number, in generating the visible light signal, the generator may cause order of transmission frames of first blocks obtained by dividing a first signal among the signal units to be different from order of transmission frames of second blocks obtained by dividing a second signal among the signal units.

With this, the receiving device can efficiently obtain all the blocks and easily decode a signal unit.

Moreover, the visible light signal may be used for transmitting a signal unit indicating predetermined information multiple times, and may include signal units each being the signal unit, the panel controller may drive the liquid crystal panel at the predetermined frequency by alternately repeating a third control for changing a transmittance of the liquid crystal panel according to the video signal and a fourth control for retaining the transmittance of the liquid crystal panel that has been changed, the display device may further include: a generator that divides each of the signal units into N blocks, and generates the visible light signal including N transmission frames, using the N blocks, and when N is a first number: in generating the visible light signal, the generator may cause order of transmission frames of first blocks obtained by dividing a first signal among the signal units to be different from order of transmission frames of second blocks obtained by dividing a second signal among the signal units; and the light source controller may perform the first control in a period during which the panel controller performs the fourth control.

With this, the receiving device can efficiently obtain all the blocks and easily decode a signal unit.

Moreover, the light source controller may: (i) perform, in the first control, a fifth control for causing a luminance change in a pattern in which an amount of deviation from a previous first control is less than a threshold value, and a sixth control for causing a luminance change in a pattern in which the amount of deviation from the previous first control is greater than or equal to the threshold value; and (ii) perform the sixth control over a period during which the panel controller performs the fourth control.

With this, the display device can suppress performance of the sixth control included in the first control in the period during which the panel controller performs the third control. Moreover, since the sixth control is performed only at the beginning of the period during which the third control is performed, it is possible to limit, even when noise is generated in a video, an area in which the noise is generated to the upper area of an image. As a result, it is possible to effectively reduce noise generated in a video displayed or projected by the display device.

Moreover, the light source may emit laser light.

With this, it is possible to effectively reduce noise generated in a video displayed or projected by the display emitting the laser light.

Moreover, the display device may display a video on a predetermined projection plane by the light source emitting the light onto the liquid crystal panel.

With this, it is possible to effectively reduce noise generated in a video displayed on a predetermined projection plane by the display device.

Moreover, the display device may be a projector.

With this, it is possible to effectively reduce noise generated in a video displayed by the projector.

A display device according to one aspect of the present disclosure is a display device including a liquid crystal panel and a light source that emits light onto the liquid crystal panel, the display device including: a video signal obtainer that obtains a video signal; a panel controller that drives the liquid crystal panel at a predetermined frequency by alternately repeating a control for changing a transmittance of the liquid crystal panel and a control for retaining the transmittance of the liquid crystal panel that has been changed, according to the video signal obtained; and a light source controller that performs, in a predetermined cycle, a control for repeating light emission patterns of the light source in a predetermined order. The light source controller synchronizes the control for repeating with a cycle for driving the liquid crystal panel by the panel controller, and causes the light source to emit the light in a light emission pattern that has lowest periodicity among the light emission patterns, in a period during which the panel controller performs the control for retaining the transmittance.

With this, the light source controller synchronizes the control for repeating the light emission patterns of the light source in a predetermined order with the cycle for driving the liquid crystal panel by the panel controller, and causes the light source to emit the light in the light emission pattern that has the lowest periodicity among the light emission patterns, in the period during which the panel controller performs the control for retaining the transmittance. With this, it is possible to suppress performance of the control having the lowest periodicity in the period during which the control for retaining the transmittance of the liquid crystal panel is performed. As a result, it is possible to effectively reduce noise generated in a video displayed or projected by the display device.

It should be noted that these general and specific aspects may be realized by a system, a method, an integrated circuit, a computer program, or a computer-readable recording medium such as a compact disc read-only memory (CD-ROM), or may be realized by any combination of systems, methods, integrated circuits, computer programs, or recording media.

Hereinafter, a display device according to one aspect of the present disclosure will be specifically described with reference to the drawings.

It should be noted that each of the embodiments described below shows a specific example of the present disclosure. The numerical values, shapes, materials, elements, the arrangement and connection of the elements, steps, the processing order of the steps, etc. shown in the following embodiments are mere examples, and are therefore not intended to limit the present disclosure.

Furthermore, among the elements in the following embodiments, those not recited in any one of the independent claims defining the most generic concept are described as optional elements.

Embodiment 1

The following describes the embodiment with reference to FIG. 1 to FIG. 12.

[1-1. Configuration]

FIG. 1 is a schematic diagram illustrating a communication system according to the embodiment.

Specifically, FIG. 1 shows display device 100, receiving device 200, and screen 300. For example, communication system 1 includes, among these elements, display device 100 and receiving device 200. In communication system 1, display device 100 emits light including a visible light signal. Display device 100 is, for example, a projector that displays a video on a predetermined projection plane, such as screen 300 and a wall surface. In other words, in display device 100, visible light signals are inserted or superimposed as information relating to the video being displayed on screen 300.

Receiving device 200 receives a visible light signal by a camera of receiving device 200 capturing the light emitted by display device 100, that is, the video displayed on screen 300. Receiving device 200 is, for example, a smartphone including an image sensor of a sequential exposure type. Accordingly, a user of receiving device 200 can receive the information etc. relating to the video being displayed by display device 100.

Although the smartphone is given as an example of receiving device 200, receiving device 200 may be any electronic device capable of receiving a visible light signal. For example, the electronic device may be a receiving device compliant with "JEITA-CP1222 Visible Light ID System" stipulated by the Japan Electronics and Information Technology Industries Association (JEITA). Further, the electronic device may be a general communication terminal.

"Being capable of receiving a visible light signal" means that it is possible to receive a visible light signal, and decode the received visible light signal to obtain information.

A communication scheme for a visible light signal may be, for example, a communication scheme compliant with "JEITA-CP-1223 Visible Light Beacon System" stipulated by JEITA, or a communication scheme compliant with IEEE-P802.15 that is wireless personal area network (WPAN) standards specified by the Institute of Electrical and Electronics Engineers, Inc. (IEEE).

In other words, receiving device 200 may be any electronic device capable of communicating using these communication schemes, and further capable of receiving a visible light signal.

[1-2. Configuration of Display Device]

The following specifically describes a configuration of display device 100 included in communication system 1.

Figure 2:
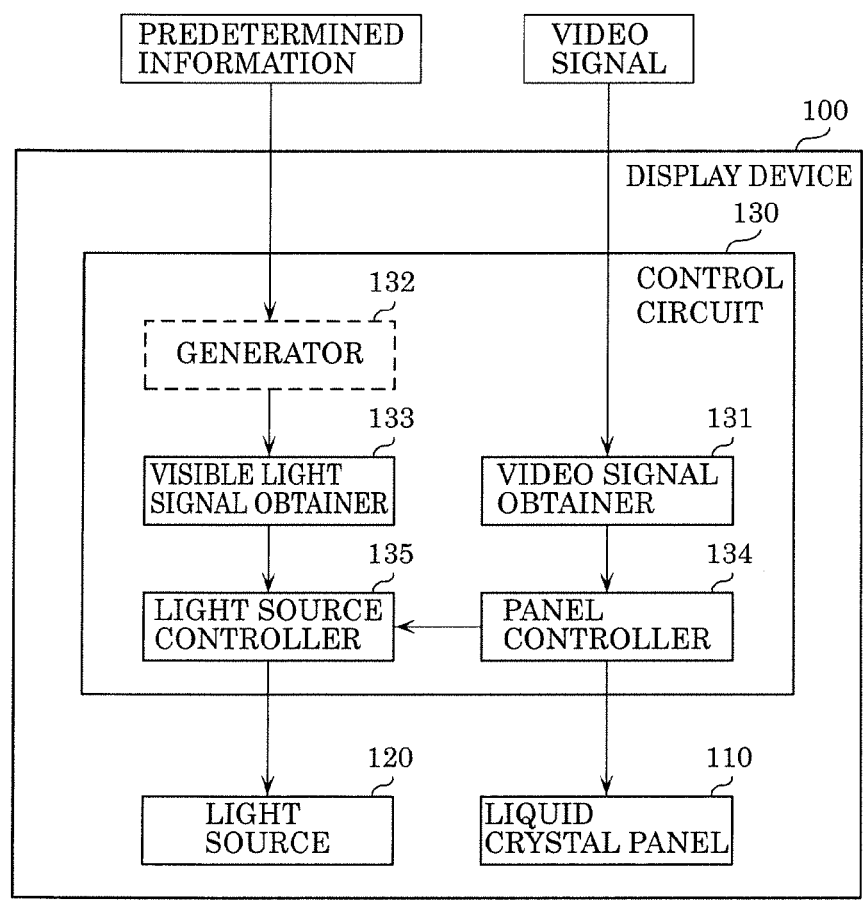
FIG. 2 is a block diagram illustrating an example of a configuration of a display device.

FIG. 2 is a block diagram illustrating an example of the configuration of the display device.

As illustrated in FIG. 2, display device 100 functionally includes liquid crystal panel 110, light source 120, and control circuit 130.

Liquid crystal panel 110 includes liquid crystal elements corresponding to pixels arranged in a matrix, and independently adjusts the transmittance of light in each of the liquid crystal elements. The liquid crystal elements are arranged in m×n in conformity to the pixels. In other words, m lines of liquid crystal elements are arranged horizontally, and n lines of liquid crystal elements are arranged vertically. Accordingly, liquid crystal panel 110 adjusts the transmittance of light emitted from light source 120 in each liquid crystal element corresponding to a different one of the pixels of liquid crystal panel 110.

Light source 120 emits light onto liquid crystal panel 110. Light source 120 is capable of emitting light that repeats a luminance change between bright and dark at a predetermined frequency. Light source 120 is realized by, for example, a semiconductor laser that emits laser light, a light-emitting diode (LED), or an organic electroluminescent (EL) illumination device.

Control circuit 130 controls operation of liquid crystal panel 110 and light source 120. Control circuit 130 may be realized by a circuit that controls both operation of liquid crystal panel 110 and operation of light source 120, or by a circuit that controls operation of liquid crystal panel 110 and a circuit that controls operation of light source 120.

Moreover, control circuit 130 may be realized by a memory that stores a program, and a processor that executes the program stored in the memory. Furthermore, control circuit 130 may be realized by a dedicated circuit. Stated differently, control circuit 130 may be realized by software or hardware.

Control circuit 130 functionally includes video signal obtainer 131, visible light signal obtainer 133, panel controller 134, and light source controller 135. Control circuit 130 may further include generator 132.

Video signal obtainer 131 obtains a video signal. Video signal obtainer 131 may obtain a video signal by receiving broadcast waves, may obtain video data indicating a video signal via a network such as the Internet, or may obtain a video signal outputted by an external device reproducing video data stored in a recording medium. Video signal obtainer 131 obtains a video signal indicating video via, for example, an antenna cable, a composite cable, a high-definition multimedia interface (HDMI(registered trademark)) cable, a PJLink cable, or a local area network (LAN) cable. In addition, video signal obtainer 131 may obtain a video signal by a reproducer included in display device 100 reproducing video data stored in a recording medium.

A video signal includes, for example, moving pictures each composed of images. Each of the images may include pixels each having a different luminance. Further, a video signal may include, for example, still images.

Generator 132 obtains predetermined information and generates a visible light signal indicating the obtained predetermined information. The following describes an example of a visible light signal generating method performed by generator 132. Generator 132 may obtain predetermined information via, for example, a LAN cable.

Figure 3:
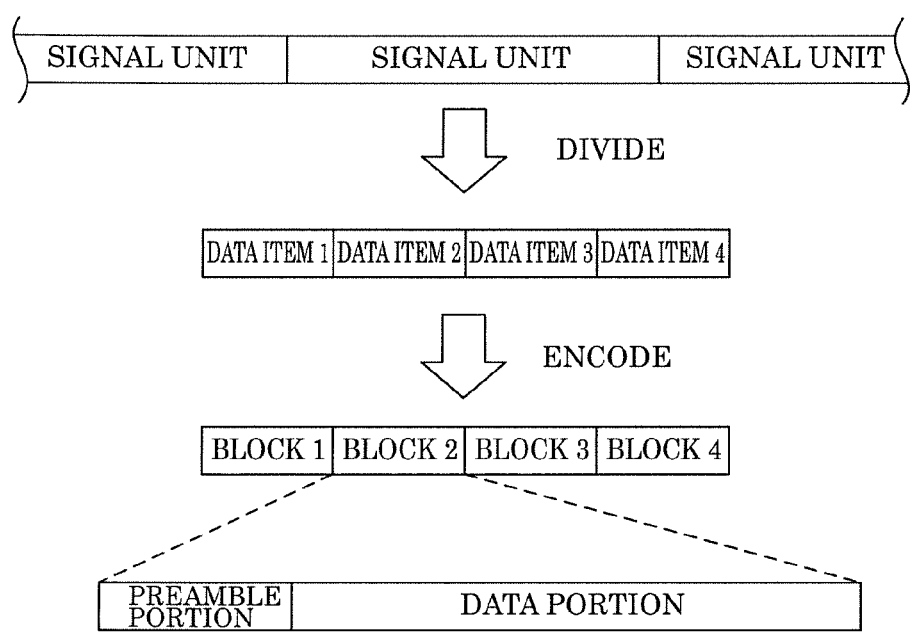
FIG. 3 is a diagram illustrating an example of generation of a visible light signal.

FIG. 3 is a diagram illustrating an example of generation of a visible light signal.

As illustrated in FIG. 3, the visible light signal includes signal units each having a predetermined length. Generator 132 divides a signal unit into a predetermined number of data items. In FIG. 3, one signal unit includes four data items having the same data length. In other words, one signal unit is divided into data item 1, data item 2, data item 3, and data item 4. The division of one signal unit may be determined based on the carrier frequency of a visible light signal outputted from display device 100, and the data length of each signal unit in the visible light signal, and further based on a period during which light source 120 emits no light, etc.

In other words, generator 132 generates, as a visible light signal, a signal that is used for repeatedly transmitting a signal unit indicating predetermined information multiple times and that includes signal units each being the signal unit. Further, generator 132 divides each of the signal unit into multiple (N) blocks, and generates a visible light signal including multiple (N) transmission frames, using the multiple (N) blocks.

It should be noted that although, in FIG. 3, the data lengths of data items into which one signal unit is divided are identical, the data lengths of data items into which one signal unit is divided may be mutually different, or the data length of one of data items into which one signal unit is divided may be different from the data lengths of the remaining data items.

Next, generator 132 encodes the divided data items, adds a preamble portion to each of the data items, determines a transmission order, and generates blocks. Specifically, generator 132 generates block 1, block 2, block 3, and block 4 from data item 1, data item 2, data item 3, and data item 4. Generator 132 transmits, as a light source control signal, the generated blocks in the order of block 1, block 2, block 3, and block 4, to light source controller 135.

A preamble portion is a pattern indicating the start of a block, and includes an identifier indicating that a data portion is a visible light signal. For example, a signal out of a coding rule such as 4 pulse-position modulation (4 PPM) or inverted 4 PPM (i-4 PPM) is used.

A data portion includes parity used for detecting errors in a data item, an address indicating a transmission order of blocks in a signal unit, and a data item. It should be noted that parity need not be included in every data portion, and may be included only in any given data portion.

Four blocks generated from one signal unit are referred to as a transmission frame.

The following gives reasons why, of luminance changes in a light source, a luminance change indicating preamble portions included in a visible light signal has a higher tendency to result in lower periodicity than a luminance change by the PWM control, and a luminance change indicating data portions included in the visible light signal has a higher tendency to result in lower periodicity than the luminance change indicating the preamble portions included in the visible light signal.

When the PWM control among the three luminance changes illustrated above is repeated in a predetermined cycle, the same PWM control as a previously performed PWM control is performed. For this reason, the PWM control has the highest periodicity among the three luminance changes. It should be noted that the PWM control is a second control to be described later.

Next, a case is considered in which the luminance change indicating the preamble portions included in the visible light signal is repeated in a predetermined cycle. A preamble portion corresponds to each of blocks into which a signal unit is divided, and preamble portions are generated for each signal unit. For example, only one of the generated preamble portions is different from the other preamble portions. For this reason, when the luminance change indicating the preamble portions included in the visible light signal is repeated in the predetermined cycle, the luminance change indicating the preamble portions included in the visible light signal conforms with a previously made luminance change in most cases. As a result, the luminance change indicating the preamble portions included in the visible light signal has the second highest periodicity among the three luminance changes. It should be noted that a control for causing the luminance change indicating the preamble portions included in the visible light signal is a fifth control to be described later.

Finally, a case is considered in which the luminance change indicating the data portions included in the visible light signal is repeated in a predetermined cycle. A data portion indicates each of data items into which a signal unit is divided. For this reason, the data items are mutually different. Accordingly, when the luminance change indicating the data portions included in the visible light signal is repeated in the predetermined cycle, the luminance change indicating the data portions included in the visible light signal does not often conform with a previously made luminance change. As a result, the luminance change indicating the data portions included in the visible light signal has the lowest periodicity among the three luminance changes. It should be noted that a control for causing the luminance change indicating the data portions included in the visible light signal is a sixth control to be described later.

Thus, a control having the lowest periodicity, that is, a luminance change (light emission pattern) is the sixth control among the second control, the fifth control, and the sixth control.

Visible light signal obtainer 133 obtains a visible light signal generated by generator 132. It should be noted that although visible light signal obtainer 133 obtains the visible light signal generated by generator 132, the present disclosure is not limited to this. Visible light signal obtainer 133 may obtain a visible light signal from an external device. Visible light signal obtainer 133 may obtain a visible light signal via, for example, a cable exclusive for visible light communication signal or a LAN cable.

Panel controller 134 drives liquid crystal panel 110 at a predetermined frequency according to a video signal obtained by video signal obtainer 131. A predetermined frequency may be, for example, determined according to frame rates of moving pictures indicated by a video signal, or preset in display device 10. Specifically, panel controller 134 drives liquid crystal panel 110 at the predetermined frequency by alternately repeating a third control for changing the transmittance of liquid crystal panel 110 according to a video signal and a fourth control for retaining the changed transmittance of liquid crystal panel 110. A method of driving liquid crystal panel 110 performed by panel controller 134 will be described with reference to FIG. 4.

Figure 4:
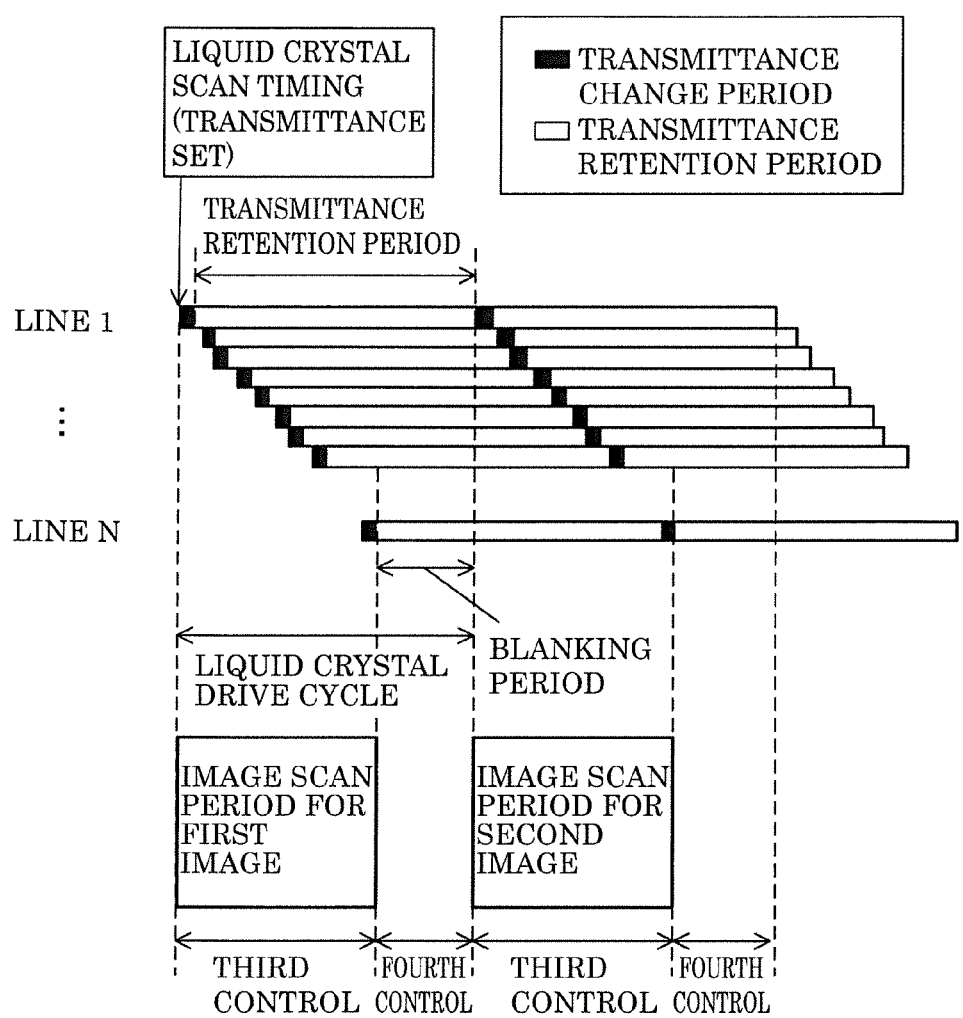
FIG. 4 is a diagram illustrating a method of driving a liquid crystal panel.

FIG. 4 is a diagram illustrating a method of driving a liquid crystal panel.

Panel controller 134 starts a liquid crystal scan and switches an image to one of images included in a video based on a video signal, at a liquid crystal scan timing indicated by a pulse repeated in a liquid crystal drive cycle based on a predetermined frequency. Specifically, immediately after panel controller 134 performs a control for changing the transmittance of liquid crystal elements in an i-th line, panel controller 134 performs a control for retaining the changed transmittance of the liquid crystal elements only for a transmittance retention period, and a control for changing the transmittance of liquid crystal elements in the next i-th+1 line. Then, panel controller 134 repeats, for each line from the first line to an n-th line in a raster order, the above control for changing the transmittance of the liquid crystal elements in the next i-th+1 line after changing the transmittance of the liquid crystal elements in the i-th line. For this reason, when display device 100 newly displays an image, it takes only as much time as scan period T from when the liquid crystal scan is started to when the transmittance of all liquid crystal elements in the n-th line is changed.

In other words, panel controller 134 performs, as the third control, a control for changing the transmittance of some of the liquid crystal elements included in liquid crystal panel 110 in scan period T. Further, panel controller 134 retains the changed transmittance of all the liquid crystal elements in a blanking period until a timing for displaying the second image following the first image in a video signal comes. In other words, panel controller 134 performs, as the fourth control, a control for retaining the transmittance, which is changed by the third control, of all the liquid crystal elements included in liquid crystal panel 110. It should be noted that the fourth control is performed in a blanking period obtained by subtracting a time required to perform the control for changing the transmittance of all the liquid crystal elements included in liquid crystal panel 110 (i.e., the third control) from a liquid crystal drive cycle.

Light source controller 135 repeats, in a predetermined cycle, a first control for causing a luminance change in light source 120 according to a visible light signal obtained by visible light signal obtainer 133. Further, light source controller 135 synchronizes a control for repeating the first control with a cycle for driving liquid crystal panel 110 by panel controller 134. Stated differently, light source controller 135 performs a control for causing the cycle for driving liquid crystal panel 110 by panel controller 134 and the predetermined cycle for repeating the first control to be the same cycle.

Light source controller 135 performs, in the first control, a fifth control for causing a luminance change in a pattern in which an amount of deviation from a previous first control is less than a predetermined threshold value, and a sixth control for causing a luminance change in a pattern in which an amount of deviation from the previous first control is greater than or equal to the predetermined threshold value. It should be noted that, for example, that an amount of deviation is less than a predetermined threshold value means that a degree of matching between the current first control and a previous first control is greater than the first threshold value. In addition, for example, that an amount of deviation is less than a predetermined threshold value means that a correlation coefficient between the current first control and a previous first control is greater than the second threshold value. In other words, that an amount of deviation is less than a predetermined threshold value means that periodicity is higher than a predetermined level. It should be noted that the fifth control and the sixth control will be illustrated with reference to FIG. 8 to FIG. 12 to be described later.

As described above, a visible light signal includes preamble portions and data portions. Data included in the preamble portions hardly change. For this reason, when the preamble portions are outputted as a luminance change in light source 120, the preamble portions hardly change, compared to a case in which a visible light signal is previously outputted. Stated differently, in the fifth control, light source 120 is caused to undergo a luminance change for outputting a signal indicating the preamble portions included in the visible light signal.

In contrast, since data included in light ID data portions contain actual data, the data are almost always different from data in a previous first control according to predetermined information. For this reason, when the light ID data portions are outputted as a luminance change in light source 120, the luminance change occurs in a different pattern, compared to a case in which a visible light signal is previously outputted. Stated differently, in the sixth control, light source 120 is caused to undergo a luminance change for outputting a signal indicating the light ID data portions included in the visible light signal.

Light source controller 135 may alternately repeat, in a predetermined cycle, the first control and the second control for causing a cyclic luminance change or an ON state in light source 120. For example, in the second control, light source controller 135 may perform a pulse-width modulation (PWM) control for causing a luminance change at a frequency higher than a frequency at which the luminance change is caused by the first control. By performing the second control, light source controller 135 is capable of emitting light having stable luminance in a period during which the first control is not performed. In consequence, light source controller 135 performs a control for repeating light emission patterns of light source 120 in a predetermined order, in the predetermined cycle. The light emission patterns include a light emission pattern by the second control, a light emission pattern by the fifth control, and a light emission pattern by the sixth control.

Light source controller 135 may perform, for example, as the second control, a PWM control having a predetermined duty cycle. Further, light source controller 135 may perform, for example, as the second control, a PWM control adjusted to a duty cycle in the luminance change by the first control. With this, it is possible to emit light having a certain luminance onto liquid crystal panel 110 both in a period during which the first control is performed and in a period during which the second control is performed. Accordingly, it is possible to effectively suppress the occurrence of flickers due to a change in average luminance, and effectively reduce noise generated in a video displayed on screen 300 by display device 100. In addition, since it is possible to reduce a sudden change in average current of light source 120, it is possible to easily use light source controller 135 having low circuit costs.

Light source controller 135 may adjust the luminance of light source 120 according to the luminance of an image indicated by a video signal. For example, light source controller 135 may adjust the luminance of light source 120 according to a pixel indicating the maximum luminance of an image indicated by a video signal. Light source controller 135 may adjust the luminance in the first control or the second control.

[1-3. Configuration of Receiving Device]

Figure 5:
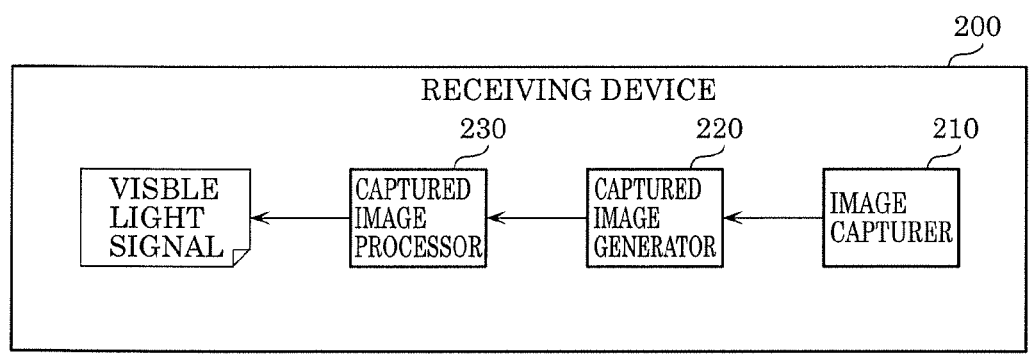
FIG. 5 is a block diagram illustrating a receiving device according to Embodiment 1.

FIG. 5 is a block diagram illustrating a receiving device according to Embodiment 1. In FIG. 5, receiving device 200 includes image capturer 210, captured image generator 220, and captured image processor 230.

Image capturer 210 captures a video being displayed in a visible light communication area of display device 100. Image capturer 210 is, for example, an image sensor of a sequential exposure type. Upon starting to capture an image, the image sensor sequentially performs exposure and transmits exposure data to captured image generator 220.

Captured image generator 220 temporarily stores the exposure data transmitted from image capturer 210 in a built-in memory. Captured image generator 220 generates a captured image based on the exposure data stored in the memory.

Captured image processor 230 reconstructs a visible light communication signal from the captured image generated by captured image generator 220.

[1-4. Output and Reception of Visible Light Communication Signal]

Next, the following describes basic operation performed by receiving device 200 to receive transmission frames outputted from the visible light communication area of display device 100.

[1-4-1. Captured Image Relative to ON and OFF of Light Source]

Figure 6:
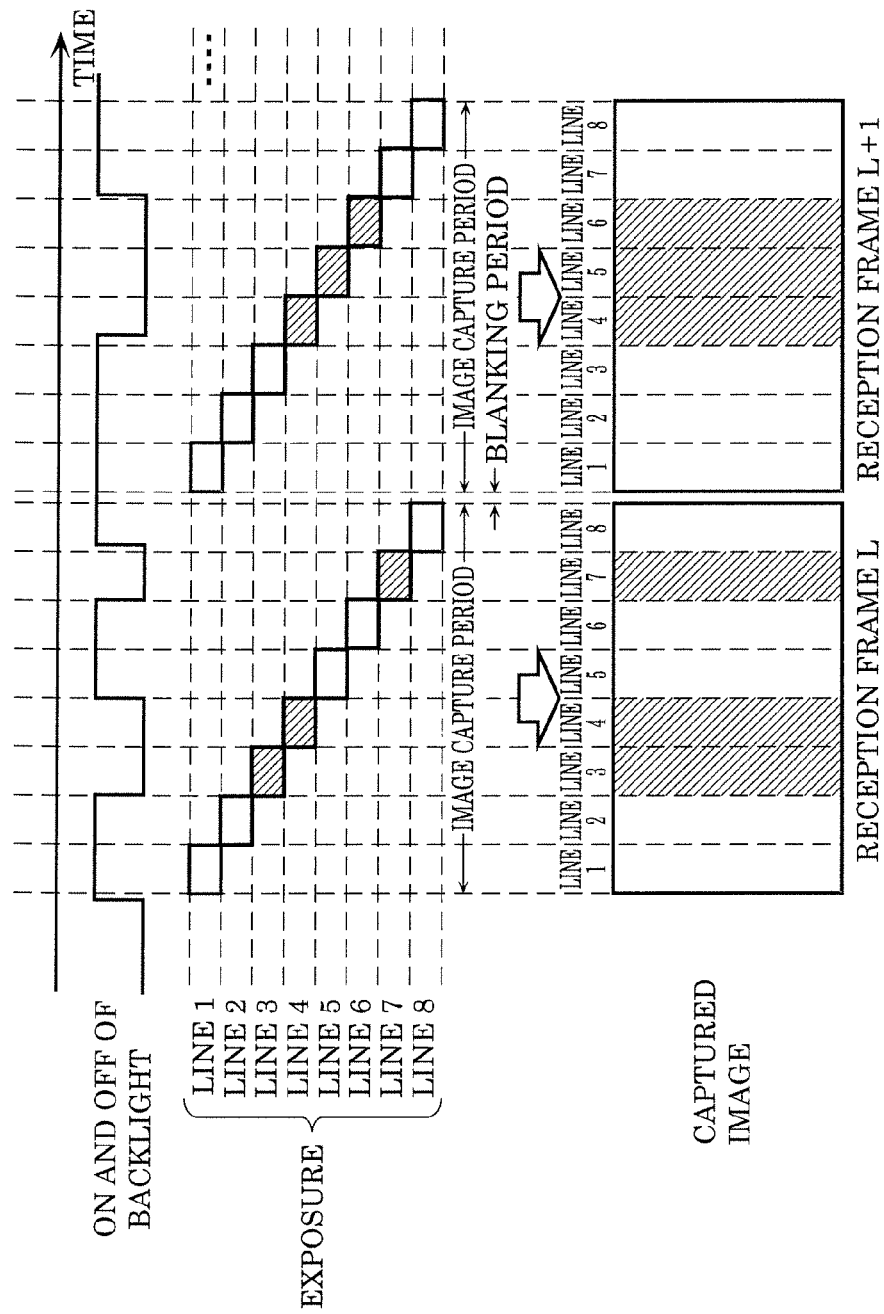
FIG. 6 is a diagram illustrating captured images of the receiving device relative to a luminance change in a light source of the display device.

FIG. 6 is a diagram illustrating captured images of receiving device 200 relative to a luminance change (ON and OFF) in light source 120 of display device 100.

Image capturer 210, which is the image sensor of the sequential exposure type, performs exposure while performing a temporal scan for each line. For simplicity, the present embodiment is described assuming that exposure elements of the image sensor are arranged in eight lines. The exposure lines are assumed to have the shape of a vertically-elongated belt in receiving device 200.

As illustrated in FIG. 6, light source 120 of display device 100 is turned ON and OFF as time advances. The image sensor performs sequential exposure from the first line to the eighth line. When the image sensor performs the sequential exposure up to the eighth line, captured image generator 220 of receiving device 200 generates a captured image based on exposure data of the eight lines. Here, a period of sequential exposure performed by the image sensor is referred to as an image capture period, and a captured image generated based on exposure data obtained by the image sensor performing the sequential exposure in the image capture period is referred to reception frame L. When the image sensor completes the exposure up to the eighth line, the image sensor returns back to the first line and starts the next exposure from the first line. A captured image generated next is referred to as reception frame L+1. There is a blanking period, such as a time for storing exposure data in the memory, from when the exposure up to the eighth light is completed to when the exposure of the next first line is started. No exposure is performed in the blanking period.

In reception frame L, since light source 120 of display device 100 is ON, each of the first, second, fifth, sixth, and eighth lines exposed by the image sensor of receiving device 200 is bright. Further, since light source 120 of display device 100 is OFF, each of the third and fourth lines exposed by the image sensor of receiving device 200 is dark. A visible light communication signal is reconstructed based on reception frame L.

In reception frame L+1, since light source 120 of display device 100 is ON, each of the first, second, third, seventh, and eighth lines exposed by the image sensor of receiving device 200 is bright. Further, since light source 120 of display device 100 is OFF, each of the fourth, fifth, and sixth lines exposed by the image sensor of receiving device 200 is dark. A visible light communication signal is reconstructed based on reception frame L+1.

[1-4-2. Captured Image Relative to Transmission Frame]

Figure 7:
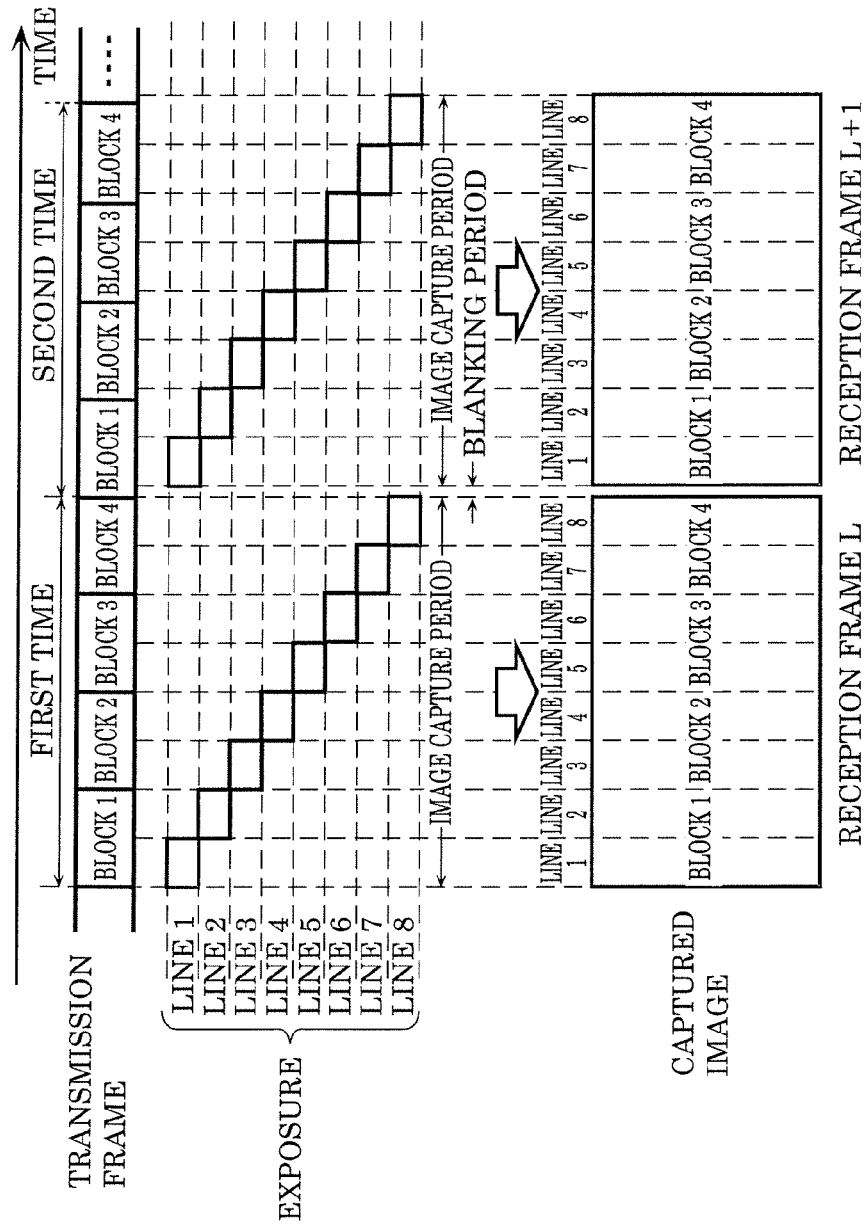
FIG. 7 is a schematic diagram illustrating captured images of the receiving device relative to transmission frames of the display device.

FIG. 7 is a schematic diagram illustrating captured images of receiving device 200 relative to transmission frames of display device 100.

As illustrated in FIG. 3, a visible light communication signal includes signal units, one signal unit is divided into four data items, and the four data items are encoded into four blocks.

In a visible light communication area in which a video is being displayed by display device 100, that is, screen 300, there may be a period in which it is not possible to determine whether light source 120 is ON or OFF, based on the content of a video signal. There is a possibility that receiving device 200 cannot receive transmission frames outputted from display device 100 in this period.

In view of the above, a carousel scheme whereby a transmission frame generated from one signal unit is repeatedly outputted multiple times is used for transmission frames to be outputted from light source 120 of display device 100. In FIG. 7, display device 100 outputs a transmission frame two times in a row using a visible light communication signal as one signal unit.

As illustrated in FIG. 7, the transmission frame is outputted by turning ON and OFF light source 120 of display device 100 as time advances. The image sensor of receiving device 200 performs sequential exposure from the first line to the eighth line. When the image sensor completes the exposure up to the eighth line, captured image generator 220 of receiving device 200 generates a captured image based on exposure data of the eight lines. To generate reception frame L that is a captured image, block 1 is received in the first and second lines exposed by the image sensor of receiving device 200, block 2 is received in the third and fourth lines exposed by the image sensor, block 3 is received in the fifth and sixth lines exposed by the image sensor, and block 4 is received in the seventh and eighth lines exposed by the image sensor. Reception frame L corresponds to the first transmission frame of one signal unit outputted from display device 100.

Moreover, in FIG. 7, to generate reception frame L+1 that is a captured image, block 1 is received in the first and second lines exposed by the image sensor of receiving device 200, block 2 is received in the third and fourth lines exposed by the image sensor, block 3 is received in the fifth and sixth lines exposed by the image sensor, and block 4 is received in the seventh and eighth lines exposed by the image sensor. Reception frame L+1 corresponds to the second transmission frame of one signal unit outputted from display device 100.

In this manner, even when radio disturbance occurs in the transmission of the first transmission frame, by sequentially outputting the transmission frame generated from one signal unit, using the carousel scheme, it is possible to receive a block that was not successfully received using the first transmission frame, using the second transmission frame. It is possible to reconstruct one signal unit by receiving all blocks, that is, four blocks using the first and second transmission frames.

Moreover, when the transmission frame is sequentially outputted using the carousel scheme, display device 100 may output a reset signal indicating a transition from the current signal unit to the next signal unit before outputting a transmission frame of the next signal unit.

This reset signal may be included in preamble portions or data portions of blocks of a transmission frame.

[1-5. Operation of Display Device]

Next, the following describes operation of the display device.

Figure 8:
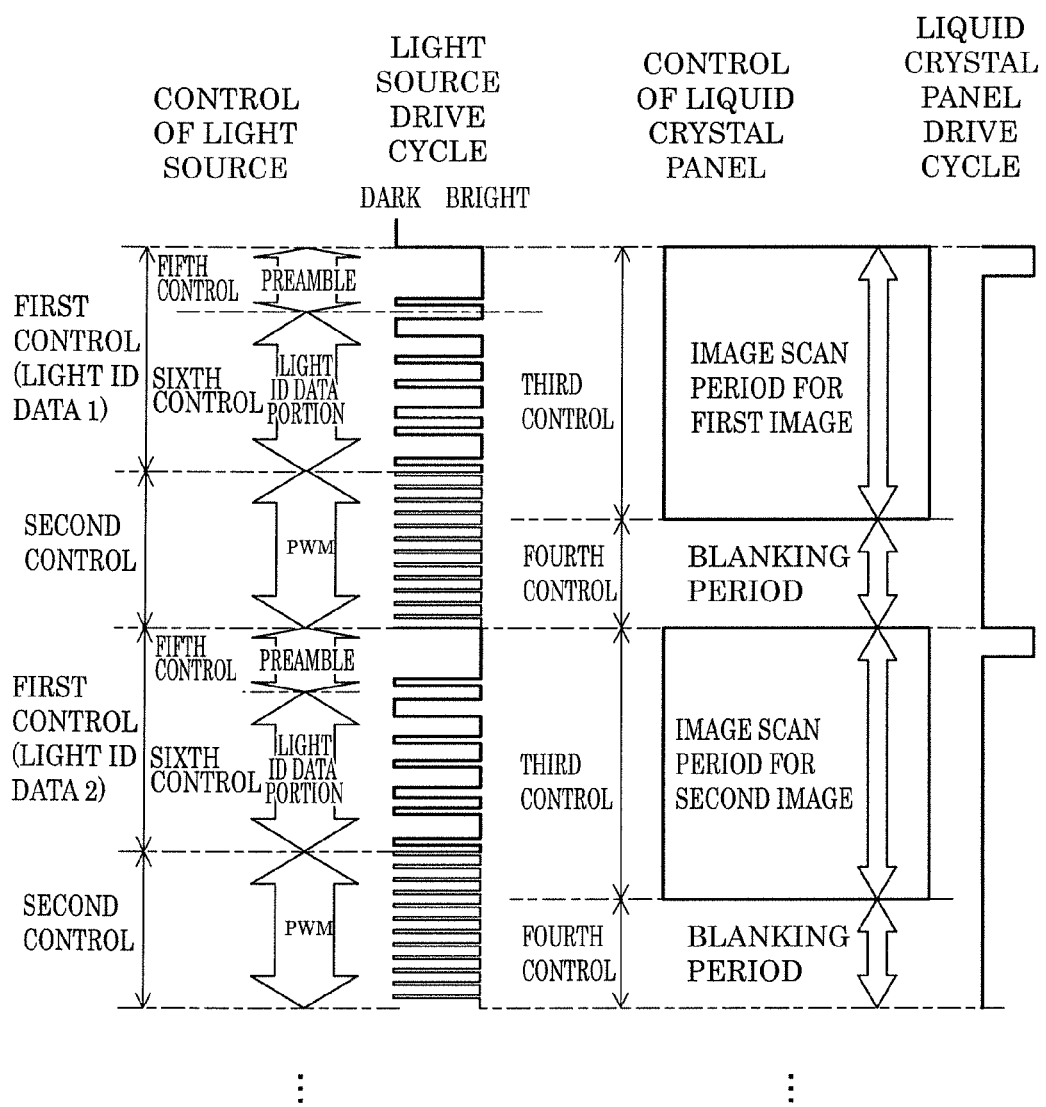
FIG. 8 is a diagram illustrating the first example of a relationship between a drive cycle of the liquid crystal panel and a drive cycle of the light source, in the display device according to the embodiment.

FIG. 8 is a diagram illustrating the first example of a relationship between a drive cycle of the liquid crystal panel and a drive cycle of the light source, in the display device according to the embodiment.

As illustrated in FIG. 8, in the first example, light source controller 135 starts the first control at a timing when panel controller 134 starts the third control. In other words, light source controller 135 starts the fifth control at this timing. By performing the sixth control after the fifth control, light source controller 135 causes light source 120 to output a luminance change indicating a visible light signal.

It should be noted that light source controller 135 performs the first control for causing, as a luminance change, a cyclic change between a first luminance and a second luminance higher than the first luminance, in light source 120. In the first control, for the cyclic luminance change between the first luminance and the second luminance, a period during which the first luminance is continued and a period during which the second luminance is continued are determined according to a visible light signal. Moreover, for example, light source controller 135 makes adjustment to continue the first luminance or the second luminance during a period that is preset according to the visible light signal. As illustrated in FIG. 8, the first luminance is denoted by "DARK," and the second luminance is denoted by "BRIGHT." The same applies to FIG. 9 to FIG. 12 to be described later.

Light source controller 135 starts the second control after the first control. Next, light source controller 135 ends the second control at a timing when panel controller 134 ends the fourth control or a timing when panel controller 134 starts the next third control. At the same time, light source controller 135 starts the first control. As stated above, light source controller 135 adjusts a cycle in which the first control and the second control are alternately repeated so that the cycle conforms with the cycle for driving liquid crystal panel 110 by panel controller 134.

In this case, upon obtaining the timing for starting the third control from panel controller 134, light source controller 135 synchronizes a control for repeating the first control for outputting the visible light signal of light source 120 with the cycle for driving liquid crystal panel 110 by panel controller 134.

In display device 100 in the first example, since light source controller 135 causes a luminance change in light source 120 according to a visible light signal, in synchronization with the cycle for driving liquid crystal panel 110 by panel controller 134, light source controller 135 enables the luminance change in light source 120 in a constant period of the cycle for driving liquid crystal panel 110. As a result, display device 100 can reduce noise generated in a video displayed on screen 300.

Figure 9:
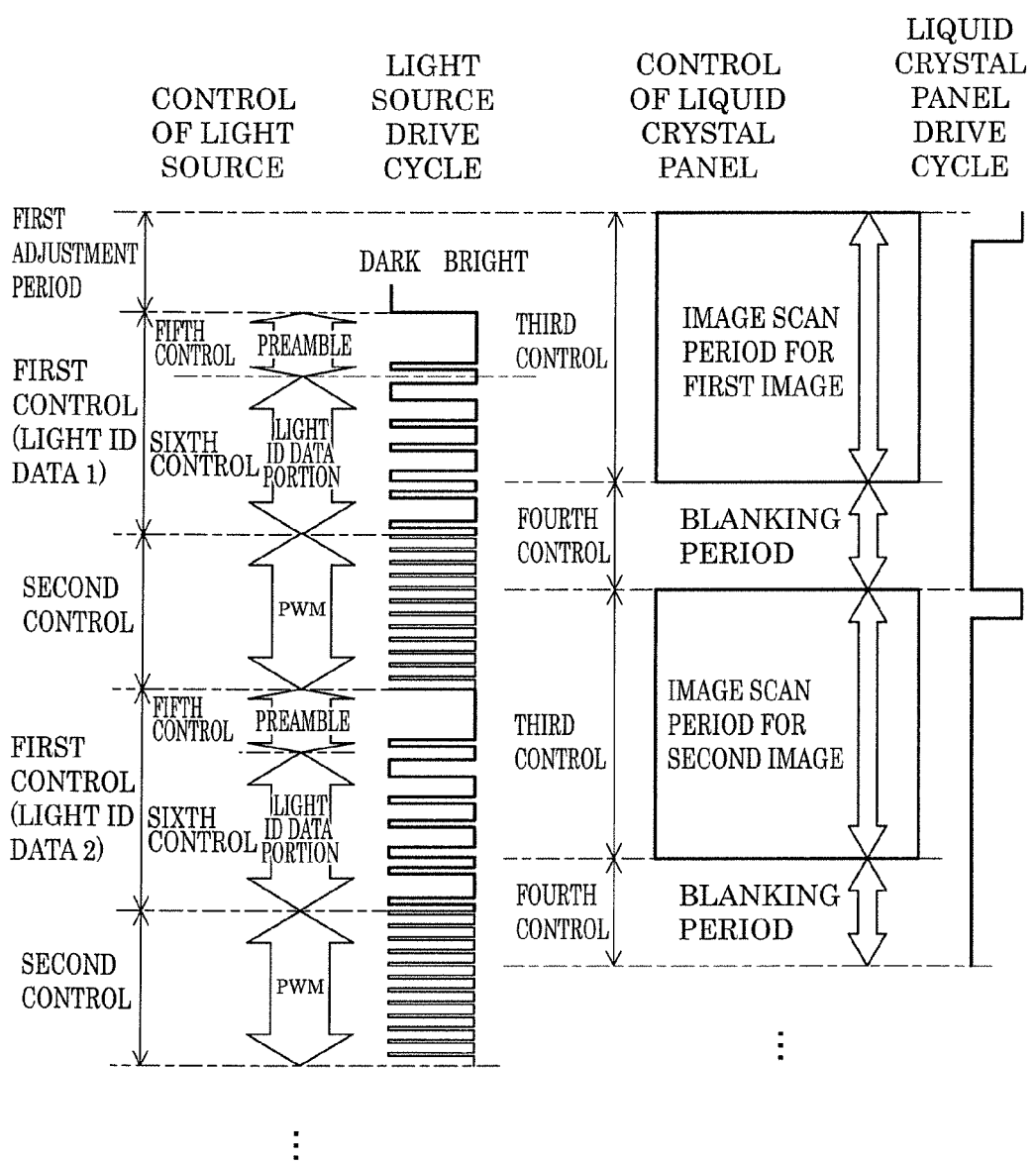
FIG. 9 is a diagram illustrating the second example of a relationship between a drive cycle of the liquid crystal panel and a drive cycle of the light source, in the display device according to the embodiment.

Moreover, light source controller 135 may drive light source 120 as illustrated in FIG. 9.

FIG. 9 is a diagram illustrating the second example of a relationship between a drive cycle of the liquid crystal panel and a drive cycle of the light source, in the display device according to the embodiment.

As illustrated in FIG. 9, in the second example, light source controller 135 starts the first control at a timing after a first adjustment period from when panel controller 134 starts the third control. By starting the first control at the timing after the first adjustment period, light source controller 135 adjusts a timing for the first control to perform the first control in a blanking period during which panel controller 134 performs the fourth control. In other words, in the second example, light source controller 135 adjusts, as in the first example, the cycle in which the first control and the second control are alternately repeated so that the cycle conforms with the cycle for driving liquid crystal panel 110 by panel controller 134. Further, light source controller 135 adjusts the timing for the first control so that the timing conforms with the blanking period during which panel controller 134 performs the fourth control.

As stated above, since light source controller 135 performs the first control for causing a luminance change in light source 120 according to a visible light signal in a period during which the fourth control for retaining the transmittance of liquid crystal panel 110 is performed, display device 100 in the second example can suppress performance of the first control in a period during which the third control for changing the transmittance of liquid crystal panel 110 is performed. In other words, display device 100 can suppress performance of the first control having lower periodicity than the second control in the period during which the third control is performed. As a result, display device 100 effectively can reduce noise generated in a video displayed on screen 300.

Figure 10:
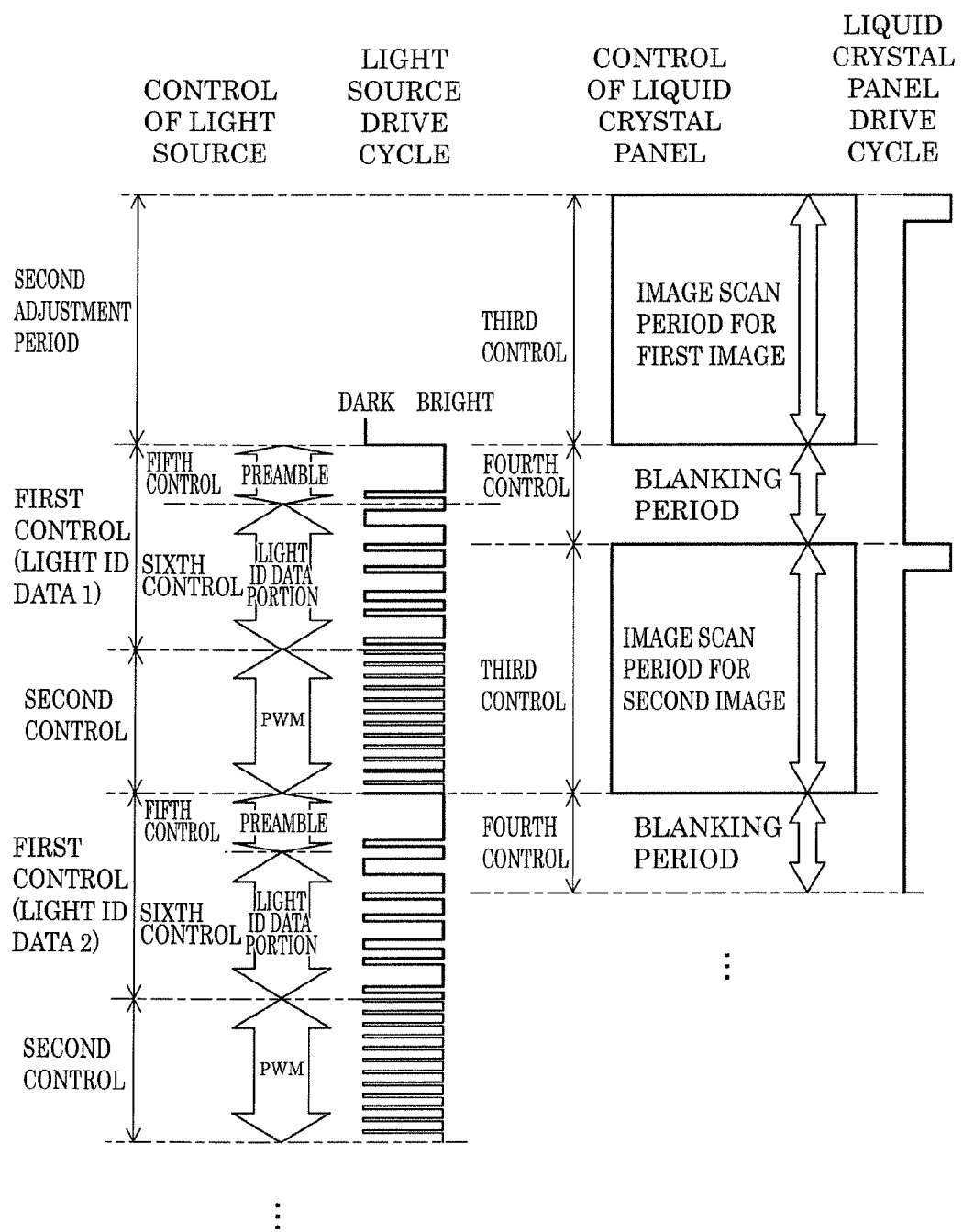
FIG. 10 is a diagram illustrating the third example of a relationship between a drive cycle of the liquid crystal panel and a drive cycle of the light source, in the display device according to the embodiment.

Moreover, light source controller 135 may drive light source 120 as illustrated in FIG. 10.

FIG. 10 is a diagram illustrating the third example of a relationship between a drive cycle of the liquid crystal panel and a drive cycle of the light source, in the display device according to the embodiment.

As illustrated in FIG. 10, in the third example, light source controller 135 starts the first control at a timing after a second adjustment period from when panel controller 134 starts the third control. By starting the first control at the timing after the second adjustment period, light source controller 135 adjusts a timing for the second control to start and end the second control within a period during which panel controller 134 performs the third control. In other words, in the third example, light source controller 135 adjusts, as in the second example, (i) the cycle in which the first control and the second control are alternately repeated so that the cycle conforms with the cycle for driving liquid crystal panel 110 by panel controller 134, and (ii) the timing for the first control so that the timing conforms with the blanking period during which panel controller 134 performs the fourth control. Further, light source controller 135 adjusts the timing for the second control to perform the second control only in the period during which panel controller 134 performs the third control. Accordingly, since the second control is performed only in the period during which the third control is performed, the second control is not performed in the period during which the fourth control is performed. It should be noted that, in the third example, light source controller 135 may assume, for example, the second adjustment period as being the same as the period during which the third control is performed.

Display device 100 in the third example allows light source 120 to emit light having a stable luminance onto liquid crystal panel 110 in the period during which panel controller 134 performs the third control. In other words, display device 100 can perform the second control having higher periodicity than the first control in the period during which the third control is performed. As a result, display device 100 can effectively reduce noise generated in a video displayed on screen 300.

Figure 11:
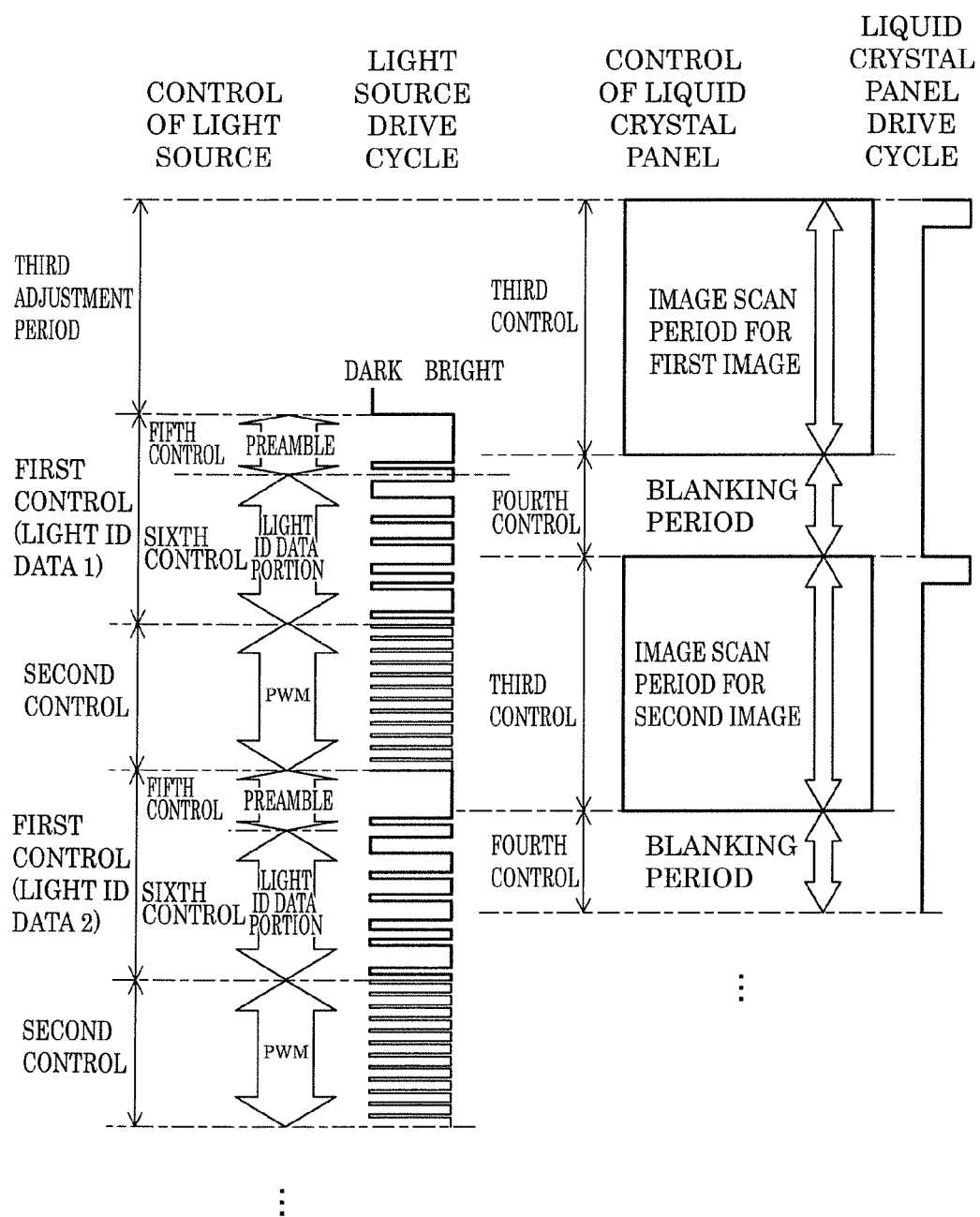
FIG. 11 is a diagram illustrating the fourth example of a relationship between a drive cycle of the liquid crystal panel and a drive cycle of the light source, in the display device according to the embodiment.

Moreover, light source controller 135 may drive light source 120 as illustrated in FIG. 11.

FIG. 11 is a diagram illustrating the fourth example of a relationship between a drive cycle of the liquid crystal panel and a drive cycle of the light source, in the display device according to the embodiment.

As illustrated in FIG. 11, in the fourth example, light source controller 135 starts the first control at a timing after a third adjustment period from when panel controller 134 starts the third control. By starting the first control at the timing after the third adjustment period, light source controller 135 adjusts a timing for the sixth control to perform the sixth control longer in a period during which panel controller 134 performs the fourth control than in a period during which panel controller 134 performs the third control. In other words, in the fourth example, light source controller 135 adjusts, as in the third example, (i) the cycle in which the first control and the second control are alternately repeated so that the cycle conforms with the cycle for driving liquid crystal panel 110 by panel controller 134, (ii) the timing for the first control so that the timing conforms with a blanking period during which panel controller 134 performs the fourth control, and (iii) the timing for the second control to perform the second control only in the period during which panel controller 134 performs the third control. Further, light source controller 135 adjusts the timing for the sixth control to perform the sixth control longer in the period during which panel controller 134 performs the fourth control than in the period during which panel controller 134 performs the third control.

Display device 100 in the fourth example can suppress performance of the sixth control included in the first control in light source controller 135, in the period during which panel controller 134 performs the third control. In other words, display device 100 can suppress performance of the sixth control having the lowest periodicity among the controls for causing the luminance change in light source 120 in the period during which the third control is performed. Moreover, since the sixth control is performed only at the beginning of the period during which the third control is performed, it is possible to limit, even when noise is generated in a video, an area in which the noise is generated to the upper area of an image. As a result, display device 100 can effectively reduce noise generated in a video displayed on screen 300.

It should be noted that, in the fourth example, light source controller 135 may perform the following adjustment instead of adjusting the timing for the sixth control to perform the sixth control longer in the period during which panel controller 134 performs the fourth control than in the period during which panel controller 134 performs the third control. Stated differently, light source controller 135 may adjust the timing for the sixth control to perform the sixth control in a period that is at least half as long as the period during which panel controller 134 performs the fourth control. With this, display device 100 can suppress performance of the sixth control included in the first control in the period during which panel controller 134 performs the third control. In other words, display device 100 can suppress performance of the sixth control having the lowest periodicity among the controls for causing the luminance change in light source 120 in the period during which the third control is performed. As a result, display device 100 can effectively reduce noise generated in a video displayed on screen 300.

Figure 12:
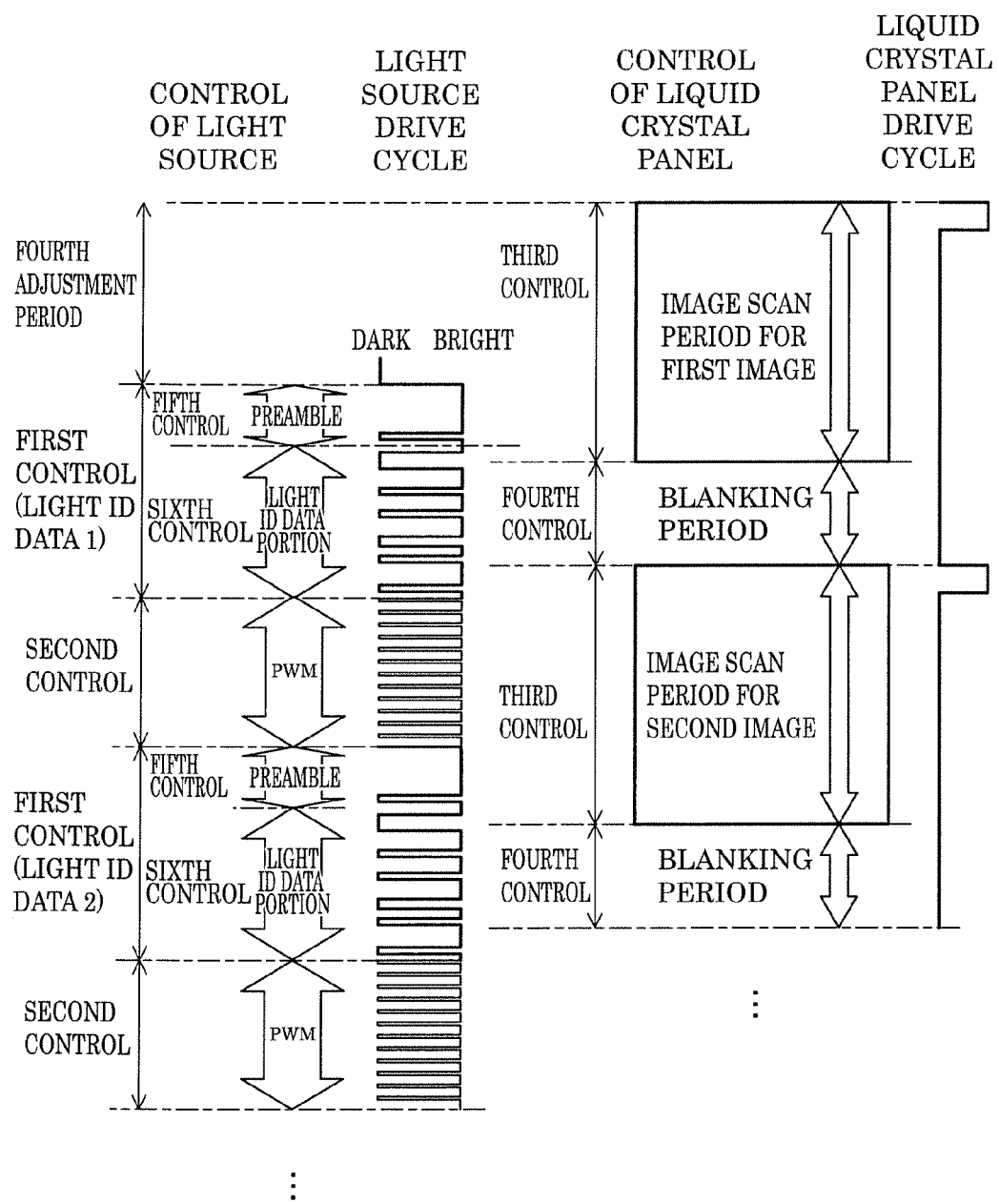
FIG. 12 is a diagram illustrating the fifth example of a relationship between a drive cycle of the liquid crystal panel and a drive cycle of the light source, in the display device according to the embodiment.

Moreover, light source controller 135 may drive light source 120 as illustrated in FIG. 12.

FIG. 12 is a diagram illustrating the fifth example of a relationship between a drive cycle of the liquid crystal panel and a drive cycle of the light source, in the display device according to the embodiment.

As illustrated in FIG. 12, in the fifth example, light source controller 135 starts the first control at a timing after a fourth adjustment period from when panel controller 134 starts the third control. By starting the first control at the timing after the fourth adjustment period, light source controller 135 adjusts a timing for the sixth control to perform the sixth control over a period during which panel controller 134 performs the fourth control. In other words, in the fifth example, light source controller 135 adjusts, as in the fourth example, (i) the cycle in which the first control and the second control are alternately repeated so that the cycle conforms with the cycle for driving liquid crystal panel 110 by panel controller 134, (ii) the timing for the first control so that the timing conforms with a blanking period during which panel controller 134 performs the fourth control, (iii) the timing for the second control to perform the second control only in the period during which panel controller 134 performs the third control, and (iv) the timing for the sixth control to perform the sixth control longer in the period during which panel controller 134 performs the fourth control than in the period during which panel controller 134 performs the third control. Further, light source controller 135 adjusts the timing for the sixth control to perform the sixth control over the period during which panel controller 134 performs the fourth control. In consequence, light source controller 135 necessarily performs the sixth control in the blanking period during which panel controller 134 performs the fourth control.

Display device 100 in the fifth example can suppress performance of the sixth control included in the first control in the period during which panel controller 134 performs the third control. In other words, display device 100 can suppress performance of the sixth control having the lowest periodicity among the controls for causing the luminance change in light source 120 in the period during which the third control is performed. As a result, display device 100 can effectively reduce noise generated in a video displayed on screen 300.

[1-6. Advantageous Effects Etc.]

In display device 100 according to the present embodiment, light source controller 135 causes a luminance change in light source 120 according to a visible light signal, in synchronization with the cycle for driving liquid crystal panel 110 by panel controller 134. Accordingly, light source controller 135 enables the above luminance change in light source 120 in a constant period of the cycle for driving liquid crystal panel 110. As a result, display device 100 can reduce noise generated in a video displayed on screen 300.

[1-7. Variations of Embodiment 1]

[1-7-1. Variation 1]

Although display device 100 according to the present embodiment is a projector, the present disclosure is not limited to this. Display device 100 may be a display including liquid crystal panel 110, such as a liquid crystal display. In this case, the display can reduce noise generated in a video displayed by liquid crystal panel 110.

[1-7-2. Variation 2]

Although, in display device 100 according to the present embodiment, light source controller 135 performs the PWM control as the second control, light source controller 135 may perform a Direct Current (DC) control for retaining the luminance of light source 120 constant.

[1-7-3. Variation 3]

Although, in display device 100 according to the present embodiment, light source controller 135 adjusts the timing for the sixth control to perform the sixth control longer in the period during which panel controller 134 performs the fourth control than in the period during which panel controller 134 performs the third control in the fourth example illustrated in FIG. 11, the present disclosure is not limited to this. For example, light source controller 135 may adjust the timing for the first control to perform the first control longer in the period during which panel controller 134 performs the fourth control than in the period during which panel controller 134 performs the third control.

Accordingly, since light source controller 135 performs the first control longer in the period during which the fourth control is performed than in the period during which the third control is performed, it is possible to effectively suppress performance of the first control in the period during which the third control for changing the transmittance of liquid crystal panel 110. Even in this case, as described above, since the first control is lower in periodicity than the second control, it is possible to effectively suppress performance of the first control having the lower periodicity than the second control in the period during which the third control is performed. As a result, display device 100 can effectively reduce noise generated in a video displayed on screen 300.

[1-7-4. Variation 4]

Although, in display device 100 according to the present embodiment, in the fourth example illustrated in FIG. 11, light source controller 135 may adjust the timing for the sixth control to perform the sixth control in the period that is at least half as long as the period during which panel controller 134 performs the fourth control, the present disclosure is not limited to this. For example, light source controller 135 may adjust a timing for the first control to perform the first control in a period that is at least half as long as the period during which panel controller 134 performs the fourth control.

[1-7-5. Variation 5]

In display device 100 according to the present embodiment, in the fourth example illustrated in FIG. 11, light source controller 135 may adjust the timing for the sixth control to perform the sixth control in the period that is at least half as long as the period during which panel controller 134 performs the fourth control, instead of adjusting the timing for the sixth control to perform the sixth control longer in the period during which panel controller 134 performs the fourth control than in the period during which panel controller 134 performs the third control. This is because, in the case of FIG. 11, when the timing for the sixth control is adjusted to perform the sixth control longer in the period during which panel controller 134 performs the fourth control than in the period during which panel controller 134 performs the third control, since the period for the sixth control is longer than the period for the fourth control, the following is satisfied: the sixth control is performed in the period that is at least half as long as the period during which panel controller 134 performs the fourth control.

Accordingly, when the period for the sixth control is shorter than the period for the fourth control, for example, light source controller 135 may adjust the timing for the sixth control to perform the sixth control longer in the period during which panel controller 134 performs the fourth control than in the period during which panel controller 134 performs the third control, and in a period that is at least half as long as the period during which panel controller 134 performs the fourth control.

[1-7-6. Variation 6]

Although, in display device 100 according to the present embodiment, light source controller 135 adjusts the timing for the sixth control to perform the sixth control longer over the period during which panel controller 134 performs the fourth control in the fifth example illustrated in FIG. 12, the present disclosure is not limited to this. Light source controller 135 may adjust the timing for the first control to perform the first control over the period during which panel controller 134 performs the fourth control.

Accordingly, since light source controller 135 performs the first control over the period during which the fourth control is performed, it is possible to suppress performance of the first control in the period during which panel controller 134 performs the third control. Even in this case, as described above, since the first control is lower in periodicity than the second control, it is possible to effectively suppress performance of the first control having the lower periodicity than the second control in the period during which the third control is performed. As a result, display device 100 can effectively reduce noise generated in a video displayed on screen 300.

Embodiment 2

Display device 100 according to Embodiment 2 will be described below.

In Embodiment 2, generator 132 divides each of signal units into five blocks, and generates a visible light signal that includes five transmission frames, using the five blocks. Display device 100 according to Embodiment 2 performs the same processing as in Embodiment 1, except processing performed by generator 132.

[2-1. Other Processing Performed by Generator]

FIG. 13 is a diagram illustrating transmission frames obtained by the receiving device when a set of five transmission frames is transmitted by driving the liquid crystal panel at a drive frequency of 180 Hz.

As illustrated in FIG. 13, a case is considered in which a camera (image sensor) of receiving device 200 captures an image in an image capture cycle of 30 fps when liquid crystal panel 110 having a drive frequency of 180 Hz displays a video. Since receiving device 200 alternately repeats image capturing for previewing an image and image capturing for analyzing a visible light signal, an image capture cycle for image capturing used for analyzing a visible light signal is 15 fps. Since five of transmission frames makes a set, and the drive frequency of liquid crystal panel 110 is 180 Hz, as illustrated in FIG. 13, after capturing the first transmission frame as an image for analysis, the camera of receiving device 200 captures, as an image for analysis, the third transmission frame different from the first transmission frame. With this, receiving device 200 can capture five different transmission frames, and extract a set of five blocks included in the set of the five transmission frames. As a result, receiving device 200 can obtain a visible light signal from the set of the five blocks.

Unfortunately, there is a case where receiving device 200 fails to obtain a set of five blocks.

FIG. 14 is a diagram illustrating transmission frames obtained by the receiving device when a set of five transmission frames is transmitted by driving the liquid crystal panel at a drive frequency of 150 Hz.

As illustrated in FIG. 14, the camera of receiving device 200 captures an image for analysis in an image capture cycle of 15 fps in the same manner as above when liquid crystal panel 110 having a drive frequency of 150 Hz displays a video. Since the drive frequency of liquid crystal panel 110 is 150 Hz, as illustrated in FIG. 14, after capturing the first transmission frame as an image for analysis, the camera of receiving device 200 captures the same first transmission frame as an image for analysis again. In such a way, since the image capture cycle of the camera of receiving device 200 synchronizes with the drive cycle of liquid crystal panel 110, receiving device 200 obtains only the same transmission frame.

In order to solve the above problem, when a drive frequency of liquid crystal panel 110 is a first frequency (e.g., 150 Hz), generator 132 may transmit transmission frames in a different order from the order of previously transmitted signal units. In other words, when a predetermined frequency at which liquid crystal panel 110 is driven is the first frequency (e.g., 150 Hz), in generating a visible light signal, generator 132 may make the order of transmission frames of first blocks obtained by dividing the first signal unit among signal units different from the order of transmission frames of second blocks obtained by dividing the second signal unit among the signal units. It should be noted that each of the first signal unit and the second signal unit is one of signal units repeatedly transmitted using the carousel scheme. Stated differently, information obtained by receiving the transmission frames of the first blocks obtained by dividing the first signal unit is the same as information obtained by receiving the transmission frames of the second blocks obtained by dividing the second signal unit. Further, each of the first blocks is the same information as any one of the second blocks.

FIG. 15 is a diagram illustrating transmission frames obtained by the receiving device when a set of five transmission frames is transmitted in a different order for each signal unit by driving the liquid crystal panel at a drive frequency of 150 Hz.

As illustrated in FIG. 15, the camera of receiving device 200 captures an image for analysis in the image capture cycle of 15 fps in the same manner as above when liquid crystal panel 110 having the drive frequency of 150 Hz displays a video. Unlike FIG. 14, in FIG. 15, control circuit 130 transmits five transmission frames in a different order from the order of previously transmitted signal units. Specifically, control circuit 130 transmits the first transmission frame in a previously transmitted signal unit at the end, and changes the order of the other transmission frames by 1 and transmits the other transmission frames in the changed order. A process of changing the transmission order of transmission frames is not limited to the above, and the transmission order may be changed by another method.

From the foregoing, as illustrated in FIG. 15, after capturing the first transmission frame as an image for analysis, the camera of receiving device 200 captures, as an image for analysis, the third transmission frame different from the first transmission frame and then captures the fifth transmission frame. With this, receiving device 200 can capture five different transmission frames, and extract a set of five blocks included in the set of the five transmission frames. As a result, receiving device 200 can obtain a visible light signal from the set of the five blocks even when the image capture cycle of the camera of receiving device 200 synchronizes with the drive cycle of liquid crystal panel 110. Accordingly, receiving device 200 can efficiently obtain all the blocks corresponding to the signal unit, and easily decode the signal unit.

It should be noted that although, in the above example, when the predetermined frequency at which liquid crystal panel 110 is driven is the first frequency, in generating the visible light signal, generator 132 makes the order of the transmission frames of the first blocks obtained by dividing the first signal unit among the signal units different from the order of the transmission frames of the second blocks obtained by dividing the second signal unit among the signal units, the present disclosure is not limited to this. For example, when a number (N) by which a signal unit is divided is a first number (e.g., 5), in generating the visible light signal, generator 132 may make the order of the transmission frames of the first blocks obtained by dividing the first signal unit among the signal units different from the order of the transmission frames of the second blocks obtained by dividing the second signal unit among the signal units. This is because when the image capture cycle of the camera of receiving device 200 synchronizes with the drive cycle of liquid crystal panel 110, receiving device 200 also depends on a number by which the signal unit is divided.

In other words, when the image capture cycle of the camera of receiving device 200 synchronizes with the drive cycle of liquid crystal panel 110, generator 132 may change the transmission order of transmission frames according to whether a value obtained by dividing the drive frequency of liquid crystal panel 110 by the number of transmission frames into which the signal unit is divided is a multiple of the drive cycle of the camera of receiving device 200.

[2-2. Variation of Embodiment 2]

[2-2-1. Variation 1]

Although the processing other than the processing performed by generator 132 in Embodiment 2 is the same as the processing in Embodiment 1, the present disclosure is not limited to this. For example, light source controller 135 may adjust a light emission timing of light source 120 only when a predetermined frequency at which liquid crystal panel 110 is driven is the first frequency (e.g., 150 Hz) or only when a number (N) by which a signal unit is divided is the first number (e.g., 5).

Even in this case, as with the fifth example illustrated in FIG. 12, light source controller 135 may perform, in the first control, the fifth control for causing the luminance change in the pattern in which the amount of deviation from the previous first control is less than the predetermined threshold value, and the sixth control for causing the luminance change in the pattern in which the amount of deviation from the previous first control is greater than or equal to the predetermined threshold value. In addition, light source controller 135 may perform the sixth control over the period during which panel controller 134 performs the fourth control.

Since noise generated in a video displayed by display device 100 becomes more prominent as the periodicity of a luminance change in light source 120 is lower, as described in Embodiment 2, the periodicity of the luminance change in light source 120 also becomes lower by making the order of the transmission frames of the first blocks obtained by dividing the first signal unit different from the order of the transmission frames of the second blocks obtained by dividing the second signal unit. This is because the periodicity varies in a unit of transmitting one signal unit more when the transmission order of the transmission frames varies than when the transmission order of the transmission frames is constant, since each of the transmission frames has a mutually different luminance change. Accordingly, it is possible to produce an advantageous effect of reducing the noise generated in the video displayed by display device 100, even when light source controller 135 adjusts the light emission timing of light source 120 only when generator 132 performs generation that further lowers the periodicity of the luminance change in light source 120 by changing the transmission order of the transmission frames for each signal unit to be transmitted.

Others

Although display device 100 according to Embodiments 1 and 2 includes generator 132, display device 100 need not include generator 132. Generator 132 described above may be included in an external device. Display device 100 may obtain, from the external device, a visible light signal generated by generator 132.

It should be noted that, in each of the aforementioned embodiments, each element may be configured using dedicated hardware or may be implemented by executing a software program suitable for the element. The element may be implemented by a program executer such as a CPU or a processor reading and executing a software program recorded on a recording medium such as a hard disk or a semiconductor memory. Here, examples of software for realizing the display device, the display method, etc. according to each of the aforementioned embodiments include the following program.

Specifically, the program causes a computer to execute a display method performed by a display device including a liquid crystal panel and a light source that emits light onto the liquid crystal panel, the display method including: obtaining a video signal; obtaining a visible light signal; driving the liquid crystal panel at a predetermined frequency according to the video signal obtained; and repeating, in a predetermined cycle, a first control for causing a luminance change in the light source according to the visible light signal, in synchronization with a cycle for driving the liquid crystal panel.

Although the display device and the display method according to one or more aspects of the present disclosure have been described above based on the aforementioned embodiments, the present disclosure is not limited to the aforementioned embodiments. The one or more aspects of the present disclosure may encompass various modifications to the present embodiments that can be conceived by a person skilled in the art or forms obtained by combining elements in different embodiments, without departing from the essence of the present disclosure.

INDUSTRIAL APPLICABILITY

The present disclosure is useful as a display device that includes a light source which emits light including a visible light signal, and a liquid crystal panel, and that is capable of effectively displaying a video.

REFERENCE MARKS IN THE DRAWINGS 1 communication system
100 display device
110 liquid crystal panel
120 light source
130 control circuit
131 video signal obtainer
132 generator
133 visible light signal obtainer
134 panel controller
135 light source controller
200 receiving device
210 image capturer
220 captured image generator
230 captured image processor
300 screen

The invention claimed is:

1. A display device including a liquid crystal panel and a light source that emits light onto the liquid crystal panel, the display device comprising:
   a memory that stores instructions; and
   a processor, when executing the instructions stored in the memory, that performs operations including:
   obtaining a video signal;
   obtaining a visible light signal;
   driving the liquid crystal panel at a predetermined frequency according to the video signal obtained; and
   repeating, in a predetermined cycle, a first control for causing a luminance change in the light source according to the visible light signal,
   wherein the processor synchronizes a control for repeating the first control with a cycle for driving the liquid crystal panel,
   wherein the processor drives the liquid crystal panel at the predetermined frequency by alternately repeating a third control for changing a transmittance of the liquid crystal panel according to the video signal and a fourth control for retaining the transmittance of the liquid crystal panel that has been changed, and
   the processor performs the first control in a period during which the fourth control is performed,
   wherein the processor:
     (i) performs, in the first control, a fifth control for causing a luminance change in a pattern in which an amount of deviation from a previous first control is less than a threshold value, and a sixth control for causing a luminance change in a pattern in which the amount of deviation from the previous first control is greater than or equal to the threshold value; and
     (ii) performs the sixth control longer in a period during which the fourth control is performed than in a period during which the third control is performed.

2. The display device according to claim 1,
   wherein the processor alternately repeats, in the predetermined cycle, the first control and a second control for causing a cyclic luminance change or an ON state in the light source.

3. The display device according to claim 2,
   wherein the processor performs, in the second control, a pulse-width modulation (PWM) control for causing a luminance change at a frequency higher than a frequency at which the luminance change is caused by the first control.

4. The display device according to claim 2,
wherein the processor adjusts a duty cycle in the luminance change caused by the second control to a duty cycle in the luminance change caused by the first control.

5. The display device according to claim 1,
wherein the processor:
(i) alternately repeats, in the predetermined cycle, the first control and a second control for causing a cyclic luminance change or an ON state in the light source;
(ii) performs the first control in the period during which the fourth control is performed; and
(iii) starts and ends the second control in a period during which the third control is performed.

6. The display device according to claim 1,
wherein the processor performs the sixth control in a period that is at least half as long as the period during which the fourth control is performed.

7. The display device according to claim 1,
wherein the processor performs the sixth control over the period during which the fourth control is performed.

8. The display device according to claim 1,
wherein the visible light signal includes a signal unit indicating predetermined information multiple times,
the processor further divides the signal unit into blocks, and generates the visible light signal including transmission frames, using the blocks, and
when the predetermined frequency at which the liquid crystal panel is driven is a first frequency, in generating the visible light signal, the processor causes an order of transmission frames of first blocks obtained by dividing a first signal unit to be different from an order of transmission frames of second blocks obtained by dividing a second signal unit.

9. The display device according to claim 1,
wherein the visible light signal includes a signal unit indicating predetermined information multiple times,
the processor further divides the signal unit into blocks, and generates the visible light signal including transmission frames, using the blocks, and
when the predetermined frequency at which the liquid crystal panel is driven is a first frequency:
in generating the visible light signal, the processor causes an order of transmission frames of first blocks obtained by dividing a first signal unit to be different from an order of transmission frames of second blocks obtained by dividing a second signal unit; and
the processor performs the first control in the period during which the fourth control is performed.

10. The display device according to claim 1,
wherein the visible light signal includes a signal unit indicating predetermined information multiple times,
the processor further divides the signal unit into N blocks, and generates the visible light signal including N transmission frames, using the N blocks, and
when N is a first number, in generating the visible light signal, the processor causes an order of transmission frames of first blocks obtained by dividing a first signal unit to be different from an order of transmission frames of second blocks obtained by dividing a second signal unit.

11. The display device according to claim 1,
wherein the visible light signal includes a signal unit indicating predetermined information multiple times,
the processor further divides the signal unit into N blocks, and generates the visible light signal including N transmission frames, using the N blocks, and
when N is a first number:
in generating the visible light signal, the processor causes an order of transmission frames of first blocks obtained by dividing a first signal unit to be different from an order of transmission frames of second blocks obtained by dividing a second signal unit; and
the processor performs the first control in the period during which the fourth control is performed.

12. The display device according to claim 1,
wherein the light source emits laser light.

13. The display device according to claim 1,
wherein the display device displays a video on a predetermined projection plane by the light source emitting the light onto the liquid crystal panel.

14. The display device according to claim 1,
wherein the display device is a projector.

15. A display device including a liquid crystal panel and a light source that emits light onto the liquid crystal panel, the display device comprising:
a memory that stores instructions; and
a processor, when executing the instructions stored in the memory, that performs operations including:
obtaining a video signal;
obtaining a visible light signal;
driving the liquid crystal panel at a predetermined frequency according to the video signal obtained; and
repeating, in a predetermined cycle, a first control for causing a luminance change in the light source according to the visible light signal,
wherein the processor synchronizes a control for repeating the first control with a cycle for driving the liquid crystal panel,
wherein the visible light signal includes a signal unit indicating predetermined information multiple times,
the processor drives the liquid crystal panel at the predetermined frequency by alternately repeating a third control for changing a transmittance of the liquid crystal panel according to the video signal and a fourth control for retaining the transmittance of the liquid crystal panel that has been changed,
the processor divides the signal unit into blocks, and generates the visible light signal including transmission frames, using the blocks, and
when the predetermined frequency at which the liquid crystal panel is driven is a first frequency:
in generating the visible light signal, the processor causes an order of transmission frames of first blocks obtained by dividing a first signal unit to be different from an order of transmission frames of second blocks obtained by dividing a second signal unit; and
the processor performs the first control in a period during which the fourth control is performed,
wherein the processor:
(i) performs, in the first control, a fifth control for causing a luminance change in a pattern in which an amount of deviation from a previous first control is less than a threshold value, and a sixth control for causing a luminance change in a pattern in which the amount of deviation from the previous first control is greater than or equal to the threshold value; and
(ii) performs the sixth control over a period during which the the fourth control is performed.

16. A display method performed by a display device including a liquid crystal panel and a light source that emits light onto the liquid crystal panel, the display method comprising:
obtaining a video signal;

obtaining a visible light signal;

driving the liquid crystal panel at a predetermined frequency according to the video signal obtained; and repeating, in a predetermined cycle, a first control for causing a luminance change in the light source according to the visible light signal, in synchronization with a control for repeating the first control with a cycle for driving the liquid crystal panel, wherein driving the liquid crystal panel is at the predetermined frequency by alternately repeating a third control for changing a transmittance of the liquid crystal panel according to the video signal and a fourth control for retaining the transmittance of the liquid crystal panel that has been changed, and the first control is performed in a period during which the fourth control is performed, wherein, in the first control, a fifth control and a sixth control are performed, the fifth control causing a luminance change in a pattern in which an amount of deviation from a previous first control is less than a threshold value, the sixth control causing a luminance change in a pattern in which the amount of deviation from the previous first control is greater than or equal to the threshold value, and the sixth control is performed longer in a period during which the fourth control is performed than in a period during which the third control is performed.

17. A display method performed by a display device including a liquid crystal panel and a light source that emits light onto the liquid crystal panel, the display method comprising:

obtaining a video signal;

obtaining a visible light signal;

driving the liquid crystal panel at a predetermined frequency according to the video signal obtained; and repeating, in a predetermined cycle, a first control for causing a luminance change in the light source according to the visible light signal, in synchronization with a control for repeating the first control with a cycle for driving the liquid crystal panel, wherein the visible light signal includes a signal unit indicating predetermined information multiple times, driving the liquid crystal panel is at the predetermined frequency by alternately repeating a third control for changing a transmittance of the liquid crystal panel according to the video signal and a fourth control for retaining the transmittance of the liquid crystal panel that has been changed, the display method further comprises:

dividing the signal unit into blocks, and generating the visible light signal including transmission frames, using the blocks, and when the predetermined frequency at which the liquid crystal panel is driven is a first frequency:

in generating the visible light signal, causes an order of transmission frames of first blocks obtained by dividing a first signal unit to be different from an order of transmission frames of second blocks obtained by dividing a second signal unit; and the first control is performed in a period during which the fourth control is performed, wherein, in the first control, a fifth control and sixth control are performed, the fifth control causing a luminance change in a pattern in which an amount of deviation from a previous first control is less than a threshold value, the sixth control causing a luminance change in a pattern in which the amount of deviation from the previous first control is greater than or equal to the threshold value, and the sixth control is performed over a period during which the fourth control is performed.

\* \* \* \* \*